United States Patent
Powell

(10) Patent No.: US 6,173,891 B1
(45) Date of Patent: *Jan. 16, 2001

(54) RETAIL STORE CONFIGURED FOR BIDIRECTIONAL COMMUNICATION BETWEEN A PLURALITY OF PRODUCT SHELF AREAS AND A PLURALITY OF PORTABLE CARDS

(75) Inventor: Ken R. Powell, Centerville, VA (US)

(73) Assignee: SoftCard Systems, Inc., Watkinsville, GA (US)

(*) Notice: Under 35 U.S.C. 154(b), the term of this patent shall be extended for 0 days.

This patent is subject to a terminal disclaimer.

(21) Appl. No.: 09/518,095

(22) Filed: Mar. 3, 2000

Related U.S. Application Data

(60) Continuation of application No. 09/032,001, filed on Feb. 27, 1998, which is a division of application No. 08/468,820, filed on Jun. 6, 1995, now Pat. No. 5,727,153.

(51) Int. Cl.[7] .................................................. G06K 15/00
(52) U.S. Cl. .......................................... 235/383; 235/381
(58) Field of Search ..................................... 235/383, 381

(56) References Cited

U.S. PATENT DOCUMENTS

| | | |
|---|---|---|
| 4,674,041 | 6/1987 | Lemon et al. . |
| 4,709,136 | 11/1987 | Watanabe . |
| 4,746,787 | 5/1988 | Suto et al. . |
| 4,866,661 | 9/1989 | de Prins . |
| 4,882,675 | 11/1989 | Nichtberger et al. . |
| 4,932,485 | 6/1990 | Mori . |

(List continued on next page.)

FOREIGN PATENT DOCUMENTS

| | | |
|---|---|---|
| 299 355A | 1/1989 | (EP) . |
| WO 86/03310 | 6/1986 | (WO) . |

OTHER PUBLICATIONS

Booker, Ellis, Computerworld, May 21, 1990, p. 47.
Maurer, Michael, Grain's Detroit Business, Jul. 25, 1994, p. 3.
Bachman, Katy, Direct, v6, n.10, p. 32, Oct. 1994.
Welcome Real–Time: Loyalty Software for Smart Cards Feb. 1, 1996: http://www.welcome–rt.com/pres/02–96.ht.
ISO7816–2: 1988(E), Identification cards —Integrated circuit (s) cards wirh contact —Part 2, International Organization for Standardization (ISO).
ISO/IEC 7816–3: 1989(E), Identification cards —Integrated circuits(s) cards with contacts —Part 3: International Organization for Standardization (ISO).
ISO/IEC 7816–3: 1989/Amd.1: 1992 (E), Part 3: Amendment 1: Protocol type T=1, asyncronous half duplex block transmission protocol., International Organization for Standardization (ISO).
P. Masterson, Targeted Discounts Scrap Paper Coupons, Jun. 13, 1994, Advertising Age, p. 40.

(List continued on next page.)

Primary Examiner—Harold I. Pitts
(74) Attorney, Agent, or Firm—Jerome D. Jackson

(57) ABSTRACT

A system for creating, dispensing, and redeeming electronic discount coupons in a store. The system includes a "smart card", product stations adjacent to selected products in the store, and a checkout station in the checkout area. To create an electronic coupon, the customer inserts the card into the product station adjacent to an product the customer wishes to purchase, and the product station then writes an electronic coupon onto the card. The customer thus shops throughout the store collecting electronic coupons for products of interest. Upon completion of shopping, the customer redeems the electronic coupons at the checkout area, by inserting the card into the checkout station. During checkout, when UPC data matches data stored on the card, the customer is credited with the value of the corresponding coupon. Periodically, the electronic coupon data is transferred to a remote clearing house.

64 Claims, 20 Drawing Sheets

U.S. PATENT DOCUMENTS

| | | |
|---|---|---|
| 4,953,746 | 9/1990 | Andriash . |
| 5,047,614 | 9/1991 | Bianco . |
| 5,083,765 | 1/1992 | Kringel . |
| 5,097,981 | 3/1992 | Degasperi et al. . |
| 5,147,021 | 9/1992 | Maruyama et al. . |
| 5,176,224 | 1/1993 | Spector . |
| 5,192,854 | 3/1993 | Counts . |
| 5,200,889 | 4/1993 | Mori . |
| 5,237,157 | 8/1993 | Kaplan . |
| 5,256,863 | 10/1993 | Ferguson et al. . |
| 5,287,181 | 2/1994 | Holman . |
| 5,287,266 | 2/1994 | Malec et al. . |
| 5,380,991 | 1/1995 | Valencia et al. . |
| 5,420,606 | 5/1995 | Begum . |
| 5,500,517 | 3/1996 | Cagliostro . |
| 5,535,118 | 7/1996 | Chumbley . |
| 5,541,985 | 7/1996 | Ishii et al. . |
| 5,604,801 | 2/1997 | Dolan et al. . |
| 5,727,153 * | 3/1998 | Powell ................................ 235/383 |

OTHER PUBLICATIONS

Trying again, with less hype, electronic marketing efforts continue,Chain Store Age Executive with Shopping Center Age, Aug. 1994, v70, n8, p. 38(2).

C. O'Leary. "Kroger to Test Electronic Displays", Supermarket News, Sep. 5, 1994, v44, n36, p. 14(1).

* cited by examiner

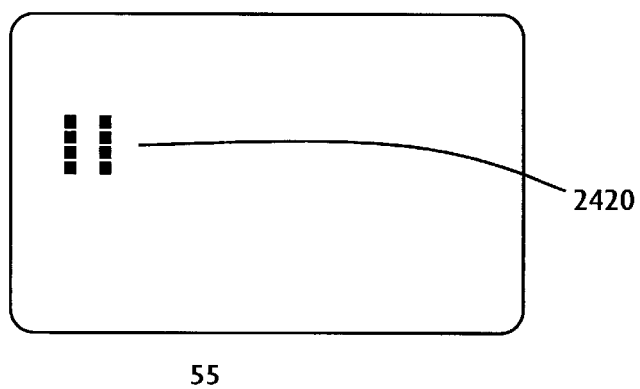
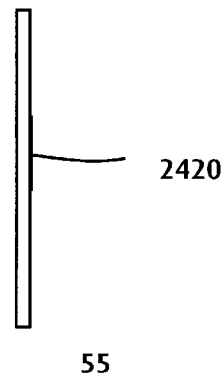
Fig. 20A Fig. 20B
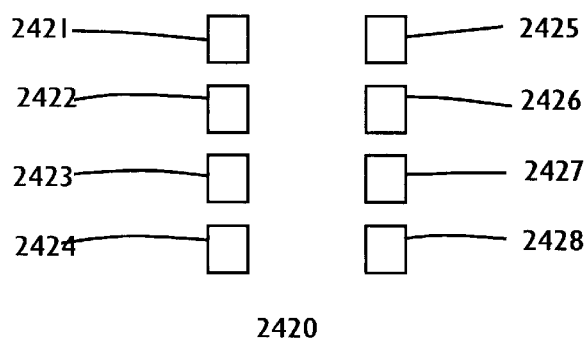
Fig. 20C

US 6,173,891 B1

RETAIL STORE CONFIGURED FOR BIDIRECTIONAL COMMUNICATION BETWEEN A PLURALITY OF PRODUCT SHELF AREAS AND A PLURALITY OF PORTABLE CARDS

This Application is a Continuation of copending application Ser. No. 09/032,001 of KEN R. POWELL filed Feb. 27, 1998 for—RETAIL STORE CONFIGURED FOR BIDIRECTIONAL COMMUNICATION BETWEEN A PLURALITY OF PRODUCT SHELF AREAS AND A PLURALITY OF PORTABLE CARDS, which is a Divisional of application Ser. No. 08/468,820 of KEN R. POWELL filed Jun. 6, 1995 for DEVICE FOR PROGRAMMING RETAIL SYSTEM, the contents of which are hereby incorporated by reference, now U.S. Pat. No. 5,727,153.

BACKGROUND OF THE INVENTION

1. Field of the Invention

This invention relates generally to a retail system and, more particularly, to a device and method for programming an electronic retail system that provides discounts for selected products within a store.

2. Description of Related Art

Discount coupons are a popular means to stimulate sales of products such as grocery store items. In 1992, approximately 310 billion coupons were distributed and 7.7 billion coupons were redeemed, saving customers $4 billion. It has been estimated that in-store couponing coupled with advertising increases sales by 544%.

A typical marketing scheme involves placing coupons in a newspaper, by printing the coupons in the newspaper or by inserting coupon inserts into the newspaper, and allowing customers to bring the printed coupons to a store for redemption. One problem with this scheme is that the redemption rate is typically only a few percent of the coupons printed, the unredeemed coupons representing an overhead associated with this scheme. To alleviate this overhead, another marketing scheme involves distributing the coupons in the store, thereby avoiding the cost of printing coupons in a newspaper, and capitalizing on the fact that 66% of buyer decisions are made at the time of product purchase. Both the in-store scheme and the newspaper scheme, however, are susceptible to fraud by an unscrupulous retailer that requests reimbursement payments by presenting unredeemed coupons to the clearing house. Other schemes include delivering coupons to consumers through the mail, distributing coupons in or on the product package, and distributing coupons at checkout. All of these schemes have an overhead cost of handling the coupons and of sending the redeemed coupons to a clearing house to enable product manufacturers to reimburse retailers for the reduction in proceeds resulting from coupon redemptions.

SUMMARY OF THE INVENTION

It is an object of the present invention to provide a convenient and stimulating shopping environment, having relatively low overhead.

According to an aspect of the present invention, there is a method for a system including a plurality of portable cards transported by consumers, each card including a flat substrate, and a memory for storing a plurality of signals corresponding to pricing information for a plurality of products, and a store includes a plurality of areas each including a shelf, a plurality of units of a respective product, the plurality of units being on the shelf, the plurality of units having a common symbol different than a symbol of units of another product, the system further including a plurality of interfaces, each including an interface junction from which signals exit the interface. The method comprises the steps, performed for each interface, of storing a respective first signal, in the interface; detecting, in the interface, a card in the plurality of cards, the detecting step being performed after the storing step, at time when the interface is supported by a shelf in a respective one of the plurality of areas and located adjacent to the plurality of units of the respective product such that no units of another product are between the interface and the plurality of units; and sending the stored first signal through the interface junction to the card detected in the previous step, at a time when the interface is supported the shelf and the respective first signal corresponds to pricing information for the product represented by the units adjacent to the interface, the sending step being performed for multiple cards per performance of the storing step.

According to another aspect of the present invention, there is a system for operating with a plurality of portable cards transported by consumers, each card including a flat substrate, and a memory for storing a plurality of signals corresponding to pricing information for a plurality of products, and a store having a plurality of areas each including a shelf, a plurality of units of a respective product, the plurality of units being on the shelf, the plurality of units having a common symbol different than a symbol of units of another product. The system comprises a plurality of interfaces, each interface including an interface junction from which signals exit the interface, a storage device for storing a respective first signal, a detector that detects a card in the plurality of cards, at a time when the respective first signal is in the storage device and the interface is supported by a shelf of one of the areas in the store and located adjacent to the plurality of units of the respective product such that no units of another product are between the interface and the plurality of units, and a sender that sends a signal through the interface junction to a card detected by the detector, at a time when the interface is supported by a shelf and the first signal corresponds to pricing information for the product represented by the units adjacent to the interface; and a programmer that programs the storage device of an interface with the respective first signal, wherein the sender of the interface is activated for multiple cards per activation of the programmer.

According to yet another aspect of the present invention, there is a system for operating with a plurality of portable cards transported by consumers, each card including a flat substrate, and a memory for storing a plurality of signals corresponding to pricing information for a plurality of products, and a store having a plurality of first areas each including a shelf, a plurality of units of a respective product, the plurality of units being on the shelf, the plurality of units having a common symbol different than a symbol of units of another product, and a checkout area, spatially removed from the plurality of first areas. The system comprises a plurality of interfaces, each interface including an interface junction from which signals exit the interface, a storage device for storing a respective first signal, a detector that detects a card in the plurality of cards, at a time when the respective first signal is in the storage device and the interface is supported by a shelf of one of the first areas in the store and located adjacent to the plurality of units of the respective product such that no units of another product are between the interface and the plurality of units, and a sender that sends a signal through the interface junction to a card detected by the detector, at a time when the interface is supported by a shelf and the first signal corresponds to pricing information for the product represented by the units adjacent to the interface; a programmer that programs the storage device of an interface with the respective first signal, wherein the sender of the interface is activated for multiple cards per activation of the programmer; and the following elements, located in the checkout area: a receiver for receiving signals corresponding to pricing information from the memory of the card, in the plurality of cards; an electromagnetic detector for generating a second signal corresponding to a product; a receiver for receiving the second signal; and a price determiner for determining a price depending on whether the second signal corresponds to one of the received signals corresponding to pricing information.

According to yet another aspect of the present invention, there is a system for operating with a store and a plurality of portable cards transported by consumers, each card including a flat substrate, and a memory for storing a plurality of signals corresponding to pricing information for a plurality of products, the store includes a plurality of areas each including a shelf, a plurality of units of a respective product, the plurality of units being on the shelf, the plurality of units having a common symbol different than a symbol of units of another product. The system comprises a plurality of interfaces, each including an interface junction from which signals exit the interface, means for holding a respective first signal, means for detecting a card in the plurality of cards, at time when the respective first signal is in the holding means and the interface is supported by a shelf in one of the plurality of areas and located adjacent to the plurality of units of the respective product such that no units of another product are between the interface and the plurality of units, and means for sending the stored first signal through the interface junction to the card detected in the previous step, at a time when the interface is supported the shelf and the respective first signal corresponds to pricing information for the product represented by the units adjacent to the interface; means for programming the holding means of an interface with the respective first signal, wherein the sending means of the interface is activated for multiple cards per activation of the programming means.

According to yet another aspect of the present invention, there is a system of operating with a store and a plurality of portable cards transported by consumers, each card including a flat substrate, and a memory for storing a plurality of signals corresponding to pricing information for a plurality of products, the store includes a plurality of first areas each including a shelf, a plurality of units of a respective product, the plurality of units being on the shelf, the plurality of units having a common symbol different than a symbol of units of another product, a checkout area including an electromagnetic detector, spatially removed from the plurality of first areas. The system comprises a plurality of interfaces, each including an interface junction from which signals exit the interface, means for holding a respective first signal, means for detecting a card in the plurality of cards, at time when the respective first signal is in the holding means and the interface is supported by a shelf in one of the plurality of areas and located adjacent to the plurality of units of the respective product such that no units of another product are between the interface and the plurality of units, and means for sending the stored first signal through the interface junction to the card detected in the previous step, at a time when the interface is supported the shelf and the respective first signal corresponds to pricing information for the product represented by the units adjacent to the interface; means for programming the holding means of an interface with the respective first signal, wherein the sending means of the interface is activated for multiple cards per activation of the programming means, means for receiving, in a computer, signals corresponding to pricing information from the memory of the card, in the plurality of cards, carried to the checkout area; means for generating, in the electromagnetic detector, a second signal corresponding to a product; means for receiving, in the computer, the second signal; and a price determiner for determining a price depending on whether the second signal corresponds to one of the received signals corresponding to pricing information.

BRIEF DESCRIPTION OF THE DRAWINGS

FIG. 3A is a plan view of one of the customer cards in the preferred system.

FIG. 3B is a sideview of the card shown in FIG. 3A.

FIGS. 9A and 9B are diagrams of some memory contents of the customer card at different points in time.

FIGS. 10A and 10B are diagrams of some memory contents of one of the product stations at different points in time.

FIG. 20A is a plan view of one of the programming card in the preferred system.

FIG. 20B is a side view of the card shown in FIG. 20A.

FIG. 20C is an enlarged, partial view of the card shown in FIG. 20A.

The accompanying drawings which are incorporated in and which constitute a part of this specification, illustrate embodiments of the invention and, together with the description, explain the principles of the invention, and additional advantages thereof. Throughout the drawings, corresponding parts are labeled with corresponding reference numbers.

DESCRIPTION OF THE PREFERRED EMBODIMENTS

Figure 1A:
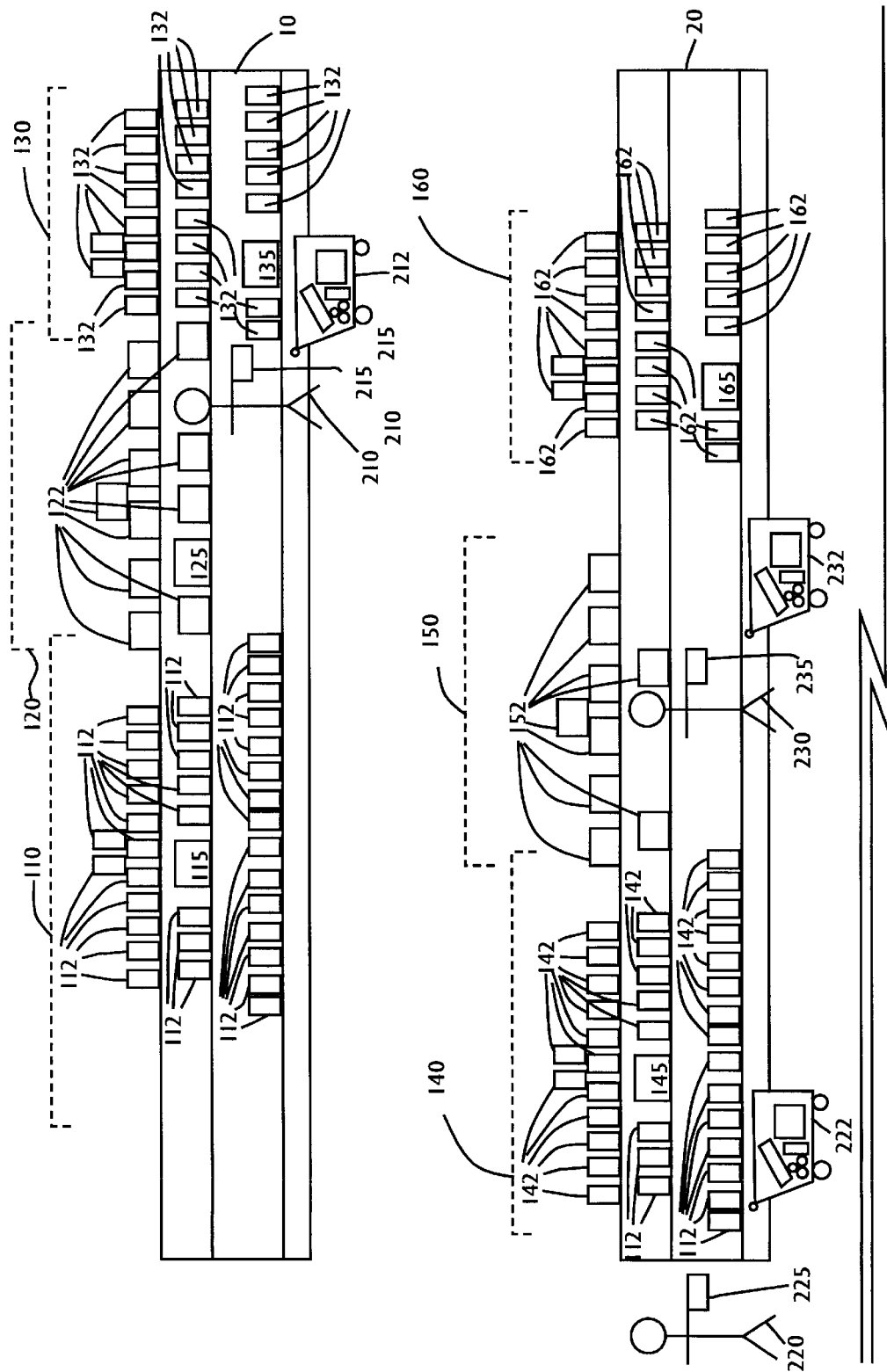
FIGS. 1A and 1B are a schematic diagram of a retail system in accordance with the preferred embodiment of the present invention.
Figure 1B:
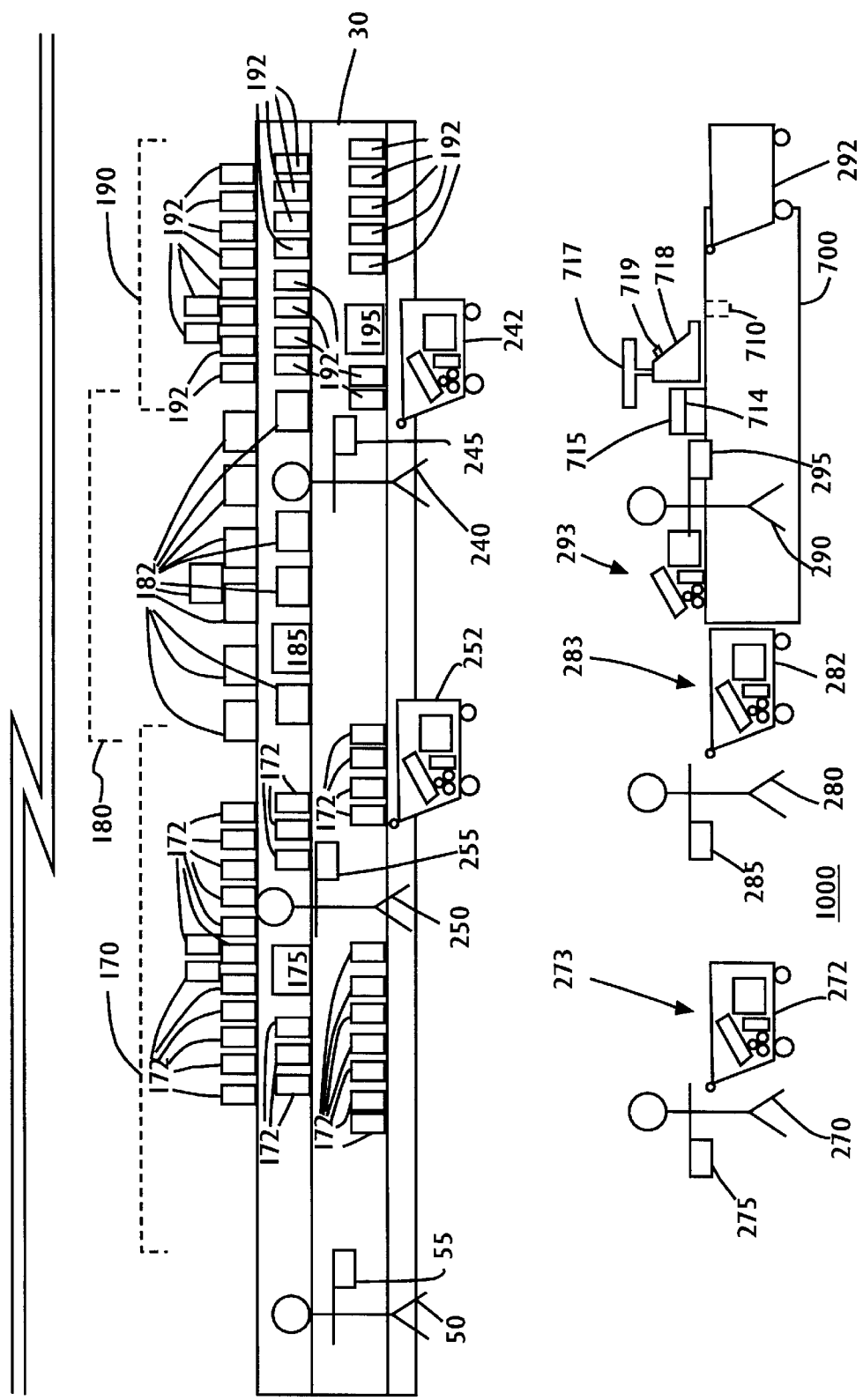

FIGS. 1A and 1B show a grocery store 1000 in accordance with a preferred embodiment of the present invention. FIG. 1A and FIG. 1B are each a partial view of store 1000. Customers 210, 220, 230, 240, 250, 270, 280, and 290, shop in the store. Before shopping in the store, each of these customers obtained a customer card. For example, customer 230 obtained customer card 235 from a bank, by completing an application for the bank. The application contained questions to collect demographic data, including birth date, income level, past buying patterns, geographic location, size of family, level of education, and job-related data. The bank subsequently wrote customer identification data for customer 230 onto customer card 235, and issued customer card 235 to customer 230, and sent the customer's demographic data to a clearinghouse which then stored the demographic data on disk. Each of customers 210, 220, 240, 250, 270, 280, and 290 obtains a respective customer card in a similar manner. In other words, for each customer the preferred method writes demographic data for the customer onto a disk in the clearinghouse, and writes personal identification data for the customer onto a respective card for the customer.

After redemption data, including customer identification data from a plurality of cards, is compiled and sent to a clearinghouse, as described below, the customer identification data is used to access the corresponding demographic data, thereby providing the manufacturer with valuable marketing data on coupon program effectiveness and customer demographics.

Alternatively, a customer may have obtained a customer card from a store, such as store 1000, by completing a check cashing application having questions to collect demographic data.

Store 1000 includes shelves 10, 20, and 30, defining aisles between the shelves. The supermarket has a plurality of product areas, each corresponding to a respective product. Product Area 110 has Acme brand ammonia. Product Area 120 has Delta brand dish detergent. Product Area 130 has Lighthouse brand light bulbs.

Some of the product areas have a respective station for reading a customer card, described in more detail below. Product Area 110 has Station 115. Product Area 120 has Station 125. Product Area 130 has Station 135.

More specifically, Product Area 110 has bottles of ammonia 112 grouped together on multiple shelves. Bottles of ammonia 112 are contiguously grouped, meaning that no other product is between any two bottles of ammonia 112. No other product is between product station 115 and bottles of ammonia 112. Product Station 115 is on a shelf under some of the bottles 112 and over some of the bottles 112. In other words, Station 115 is adjacent to bottles 112 and supported by a shelf that is in vertical alignment with some of the bottles 112.

Figure 2A:
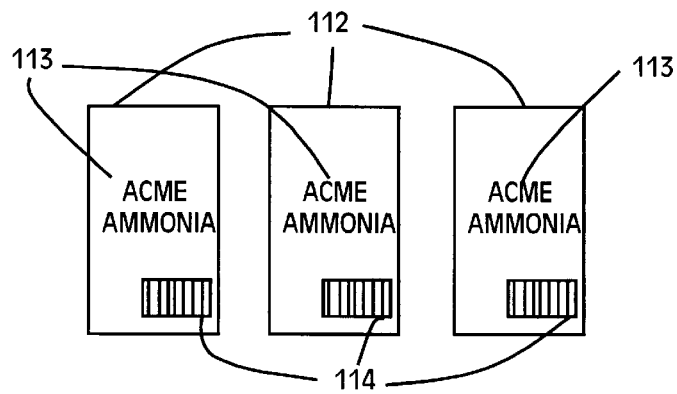
FIGS. 2A, 2B, and 2C are enlarged views of some of the products shown in FIGS. 1A and 1B.

FIG. 2A shows an enlarged view of some of the bottles of ammonia 112. Each bottle of ammonia has a common Universal Product Code (UPC) label 114, which is a group of parallel lines that encodes a number that uniquely identifies acme ammonia. In other words, label 114 is different than labels of units of other products. Each bottle of ammonia 112 also has a common character label 113. Character label 113 is "ACME AMMONIA." Label 113 is different than labels of units of other products.

Product Area 120 has boxes of detergent 122 grouped together on multiple shelves. Boxes of detergent 120 are contiguously grouped, meaning that no other product is between any two boxes of detergent 120. No other product is between product station 125 and boxes of detergent 122. Product Station 125 is on a shelf under some of the boxes 122. In other words, station 125 is adjacent to boxes 122 and supported by a shelf in vertical alignment with some of the boxes 122.

Figure 2B:
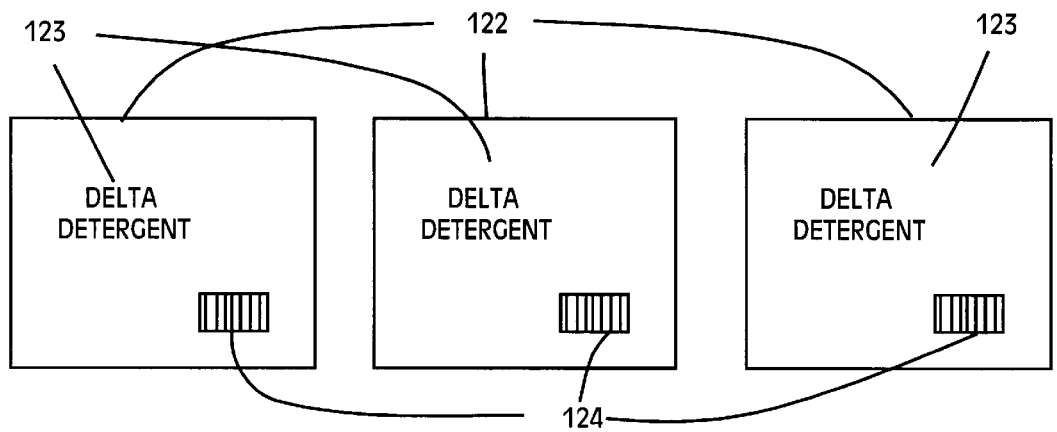

FIG. 2B shows an enlarged view of some of the boxes of detergent 122. Each box of detergent 122 has a common Universal Product Code (UPC) label 124, which is a group of parallel lines that encodes a number that uniquely identifies delta detergent. In other words, label 124 is different than labels of units of other products. Each box of detergent 124 also has a common character label 123. Character label 123 is "DELTA DETERGENT." Label 123 is different than labels of units of other products.

Product Area 130 has boxes of light bulbs 132 grouped together on multiple shelves. Boxes of light bulbs 132 are contiguously grouped, meaning that no other product is between two boxes of light bulbs 132. No other product is between product station 135 and boxes of light bulbs 132. Product Station 135 is on a shelf under some of the boxes 132. In other words, station 135 is adjacent to boxes 132 and supported by a shelf in vertical alignment with some of the boxes 132.

Figure 2C:
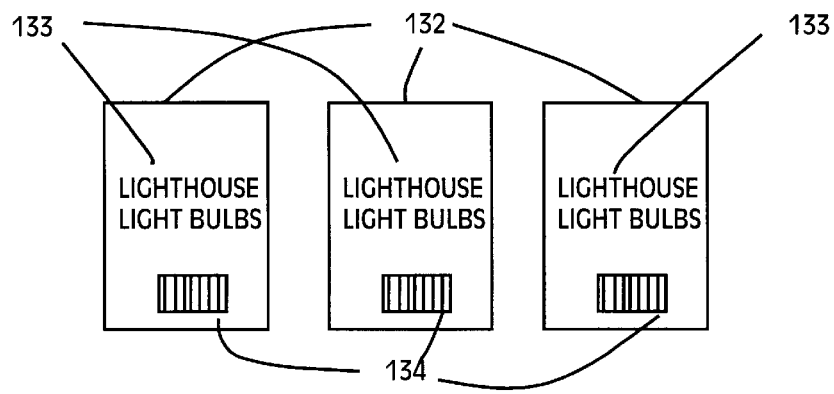

FIG. 2C shows an enlarged view of some of the boxes of light bulbs 132. Each box of light bulbs 132 has a common Universal Product Code (UPC) label 134, which is a group of parallel lines that encodes a number that uniquely identifies Lighthouse light bulbs. In other words, label 134 is different than labels of other products. Each box 132 also has a common character label 133. Character label 133 is "LIGHTHOUSE LIGHT BULBS." Label 133 is different than labels of other products.

Similarly, other product area in the store each have a set of respective products contiguously grouped together and a corresponding product station adjacent to the products. The respective units of a certain product have a common label, different than labels on units of other products, that uniquely identifies the certain product. No other product is between a product station and the units of the corresponding product. Product area 140 has bottles of ketchup 142 contiguously grouped together, and product station 145 adjacent to the bottles of ketchup 142. Product area 160 has loaves of bread 162 contiguously grouped together, and product station 165 adjacent to loaves of bread 162. Product area 170 has cartons of milk 172 contiguously grouped together, and product station 175 adjacent to cartons of milk 172. Product area 180 has packages of bacon 182, and product station 185 adjacent to packages of bacon 182. Product area of 190 has packages of butter 192 contiguously grouped together and product station 195 adjacent to packages of butter 192.

Product area 150 has boxes of cereal 152 contiguously grouped together. Product area 150 does not have a product station.

While shopping in store 1000, each of customers 210, 220, 230, 240, 250, 270, 280, and 290 carries his or her respective customer card. Customer 210 carries card 215, customer 220 carries card 225, customer 230 carries card 235, customer 240 carries card 245, customer 250 carries card 255, customer 270 carries card 275, customer 280 carries card 285, and customer 290 carries card 295. Each customer tows a shopping cart to hold selected products. Customer 210 tows cart 212, customer 220 tows cart 222, customer 230 tow cart 232, customer 240 tows cart 242, customer 250 tows cart 252, customer 270 tows cart 272, customer 280 tows cart 282, and customer 290 tows care 292. To create an electronic coupon, the customer inserts the card into the product station adjacent to a product the customer wishes to purchase, and the product station then writes an electronic coupon onto the card. In other words, the product station writes an electronic coupon into a memory on the card, in response to a person presenting the card at the product station. The customer then removes the product from the shelf and places the removed product into her cart. The customer thus shops throughout the store collecting electronic coupons for products of interest.

The preferred method thus includes a step, performed for a plurality of the customer cards, of writing a product identification signal, corresponding to a selected product, onto the customer card.

Upon completion of shopping, the customer brings selected products from shelves 10, 20, and 30 to checkout counter 700. The customer redeems the electronic coupons at the checkout area, by inserting her customer card into checkout station 715. For example, a customer such as customer 290 in FIG. 1B completes the purchase of her selected products 293 by transferring products 293 from her cart 292 to counter 700, and by inserting card 295 into checkout station 715. Subsequently, a checkout clerk (not shown) scans each selected product past UPC bar code reader 710. Bar code reader 710 is an optical detector. In other words, bar code reader 710 detects an electromagnetic signal. A processor coupled to station 715 and reader 710 determines whether the most recently scanned product is on a discount list stored in card 295. If the most recently scanned product is identified in this discount list, a price for the product is determined using the discount data corresponding to the product, and the resulting price is displayed on display 717. Checkout counter 700 scans and processes each product 293 in a similar manner.

Similarly customer 280 in FIG. 1B will complete the purchase of her selected products 283 by transferring products 283 from her cart 282 to counter 700, and by inserting card 285 into checkout station 715; and the checkout clerk (not shown) will scan each selected product 283 past UPC bar code reader 710. Customer 270 will complete the purchase of her selected products 273 by transferring products 273 from her cart 272 to counter 700, and by inserting card 275 into checkout station 715; and the checkout clerk (not shown) will scan each selected product 273 past UPC bar code reader 710.

Periodically, checkout counter 700 sends redemption data to an electronic clearing house. This redemption data includes the identification of the store and of the customers who presented electronic coupons for redemption.

FIG. 3A shows a plan view of customer card 215 carried by customers 210, and FIG. 3B shows a side view of card 215. Card 215 is 8.5 cm by 5.4 cm, the length and width of a typical financial credit card. Card 215 is slightly thicker than a typical financial credit card. Card 215 includes a magnetic stripe 2410, interface contacts 2420 for communication with the product stations and the checkout station, and embossed area 2430 for displaying the card owner's name. Magnetic stripe 2410 allows a conventional credit card stripe reader to read basic data from the card. Magnetic stripe 2410 is not necessary to the operation of the preferred embodiment of the invention, described in more detail below.

Figure 3C:
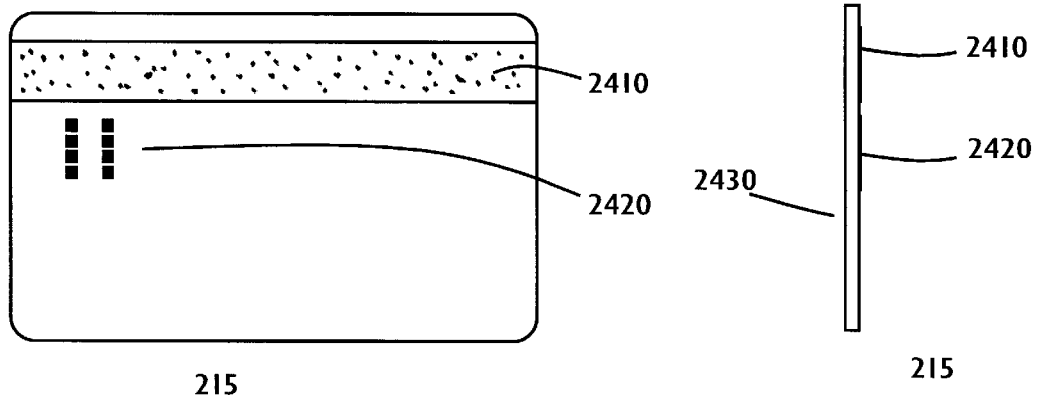
FIG. 3C is an enlarged, partial view of the card shown in FIG. 3A.
Figure 3C:
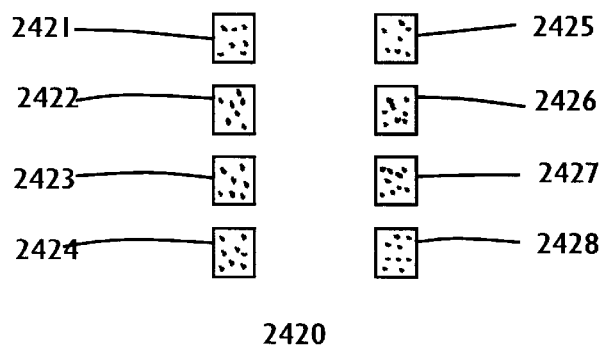

FIG. 3C shows interface contacts 2420 in more detail. Interface contacts 2420 are configured in accordance with ISO7816-2: 1988(E), Identification cards—Integrated circuit(s) cards with contact—Part 2: Dimensions and locations of the contacts, promulgated by the International Organization for Standardization (ISO), and available from the American National Standards Institute (ANSI), 11 West 42nd Street, New York, N.Y. 10036. According to ISO 7816-2, contact 2421 is assigned to VCC (supply voltage), contact 2422 is assigned to RST (reset signal), contact 2423 is assigned to CLK (clock signal), contact 2424 is reserved for future use, contact 2425 is assigned to GND (ground), contact 2426 is assigned to VPP (program and voltage), contact 2427 is assigned to I/O (data input/output), and contact 2428 is reserved for future use. Card 215 communicates with the product stations and the checkout stations through contact 2427 using a half duplex scheme, meaning that contact 2427 is for communicating data signals either to or from the card.

Figure 4:
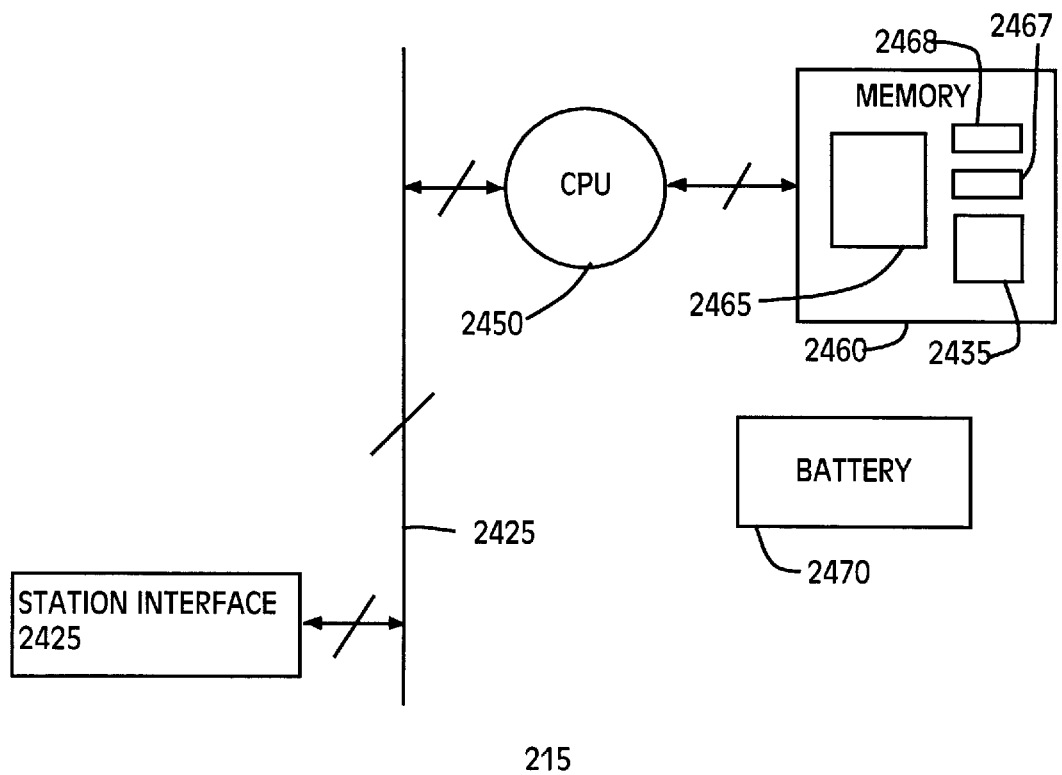
FIG. 4 is a block diagram of the customer card.

FIG. 4 is a block diagram of customer card 215, including central processing unit 2450, memory 2460, and battery 2470 for supplying power to interface 2425, processor 2450, and memory 2460. Memory 2460 is a random access, addressable device. Station interface 2425 includes a serial to parallel converter for transferring data signals between contact 2427 and CPU 2450 over parallel bus 2452. Memory 2460 stores a program 2465 executed by processor 2450, customer identification data 2467, and authorization data 2468. Customer identification data 2467 includes a sequence of digits that uniquely identifies the holder of the card. Customer identification data 2467 includes the card holder's social security number. For example, identification data 2467 in customer card 235 uniquely identifies customer 230. Authorization data 2468 includes a sequence of digits that includes a code identifying the store or stores in which the card may be used to obtain a paperless coupon. Authorization data 2468 also includes date data indicating an expiration date for the card. Depending on the card holder's contractual relationship with the card issuer, the card issuer may periodically update this date data to renew the card when the current date data indicates the card is expired. Store authorization data 2468 also contains a field identifying that the card is a customer card (rather than a programming card, which is described below).

Memory 2460 also stores product data received from one or more of the product stations. This product data includes a list of product discounts 2435. When a customer inserts a customer card into one of the product stations, processor 2450 receives an identification code for the product from the station and adds the code to the list.

Each of customer cards 225, 235, 245, 355, 275, and 295 has the same hardware structure as customer card 215.

Programming card 55 has the same hardware structure as customer card 215. FIG. 20A shows a plan view of programming card 55, and FIG. 20B shows a side view of card 55. Card 55 is 8.5 cm by 5.4 cm, the length and width of a typical financial credit card. Card 55 is slightly thicker than a typical financial credit card. Card 55 includes interface contacts 2420 for communication with the product stations and the checkout station, and embossed area 2430 for displaying information about the card.

FIG. 20C shows interface contacts 2420 in more detail. Interface contacts 2420 are configured in accordance with ISO7816-2: 1988(E), Identification cards—Integrated circuit(s) cards with contact—Part 2: Dimensions and locations of the contacts, promulgated by the International Organization for Standardization (ISO), and available from the American National Standards Institute (ANSI), 11 West 42nd Street, New York, N.Y. 10036. According to ISO 7816-2, contact 2421 is assigned to VCC (supply voltage), contact 2422 is assigned to RST (reset signal), contact 2423 is assigned to CLK (clock signal), contact 2424 is reserved for future use, contact 2425 is assigned to GND (ground), contact 2426 is assigned to VPP (program and voltage), contact 2427 is assigned to I/O (data input/output), and contact 2428 is reserved for future use. Card 55 communicates with the product stations through contact 2427 using a half duplex scheme, meaning that contact 2427 is for communicating data signals either to or from the card.

Other features of the preferred system are the subject of copending application Ser. No. 08/468,816 of KEN R. POWELL for RETAIL SYSTEM, filed concurrently with the instant application on Jun. 6, 1995.

Figure 5:
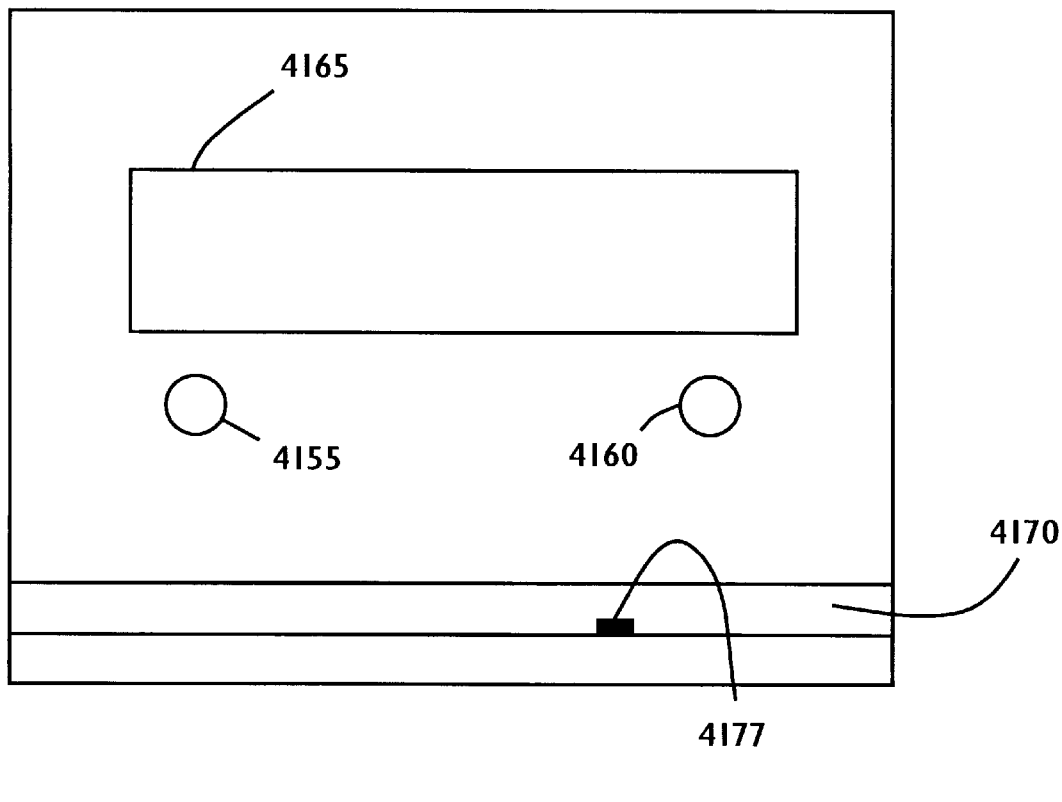
FIG. 5 is a diagram of one of the product stations for transferring an electronic coupon to the card.

FIG. 5 shows product station 115, including green light 4155, red light 4160, and interface slot 4170. Station 115 also has an optional liquid crystal display (LCD) for displaying product promotional messages. Interface slot 4170 has a width sufficient to accommodate the width of one of the customer cards. When a customer card is in interface slot 4170, conductive contact 4177 inside interface slot 4170 touches contact 2427 on the customer card. Interface slot 4170 has other contacts (not shown) for touching the other card contacts 2420.

Figure 6:
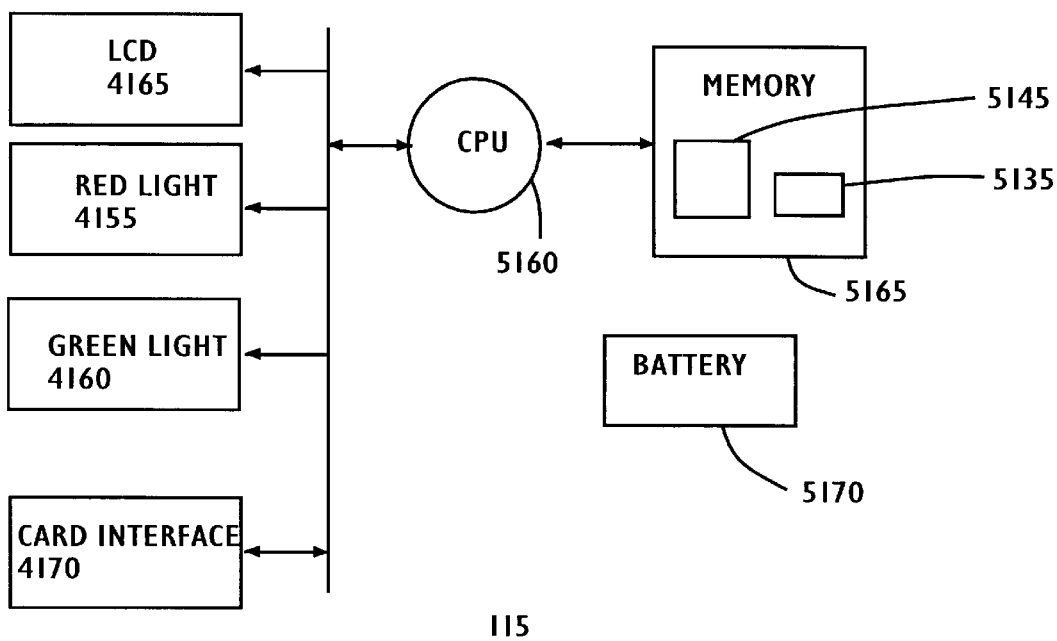
FIG. 6 is a block diagram of the product station shown in FIG. 5.

FIG. 6 shows a block diagram of station 115, including central processing unit 5160, memory 5165, and battery 5170. Memory 5165 stores program 5145, executed by CPU 5160, and product data 5135. Memory 5165 is a random access, addressable device.

Station 115 has no external wires connecting station 115 to another device. There is no need for external wires because station 115 is powered by its own battery 5170, and is programmed by programming card 55 described in more detail below.

Each product station has the same hardware structure as product station 115. Each product station is locked to one of the shelves with a keyed lock.

Figure 7:
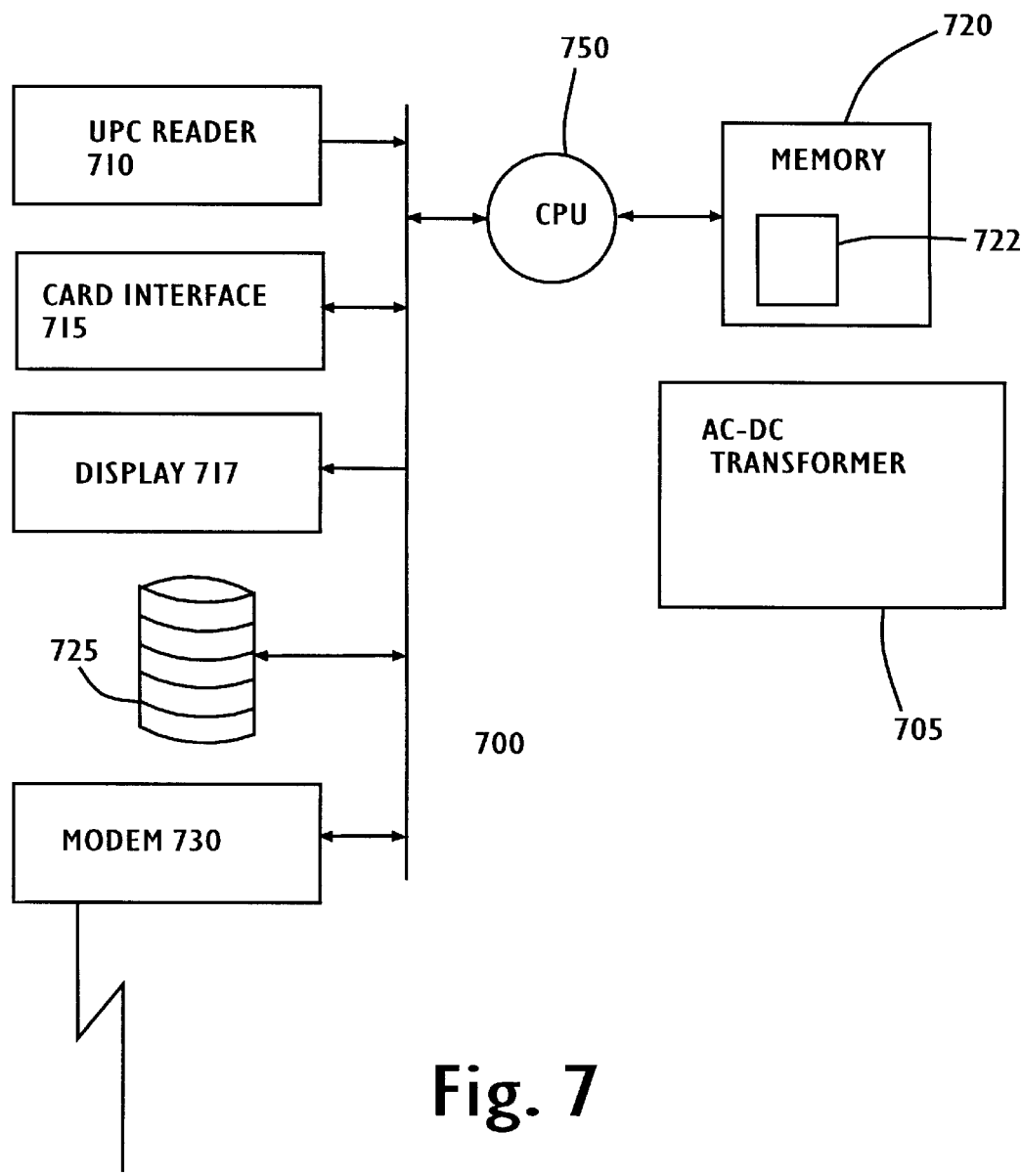
FIG. 7 is a block diagram of the check-out station shown in FIG. 1.

FIG. 7 is a block diagram of checkout counter 700 shown in FIG. 1B. Disk 725 provides long term storage. CPU 750 executes instructions in random access, addressable memory 720. The hardware architecture of checkout station 715 is the same as the hardware architecture of checkout station 215, described above. Transformer 705 transforms 60 Hz line power into DC power and provides the DC power to CPU 750 memory 720, UPC reader 710, checkout station 715, and other electronics within checkout counter 700.

CPU 750 and program 722 act to detect a product scanned by UPC reader 710, determine a reference price for the product, search for the product's identification in the memory of a customer card, and deduct a discount from the reference price if the product is identified in the customer card memory. CPU 750 then displays the price of the product on display 717. CPU 750 writes coupon redemption data onto disk 725. Periodically, CPU 750 sends the redemption data to an electronic clearing house through modem 730.

Figure 8:
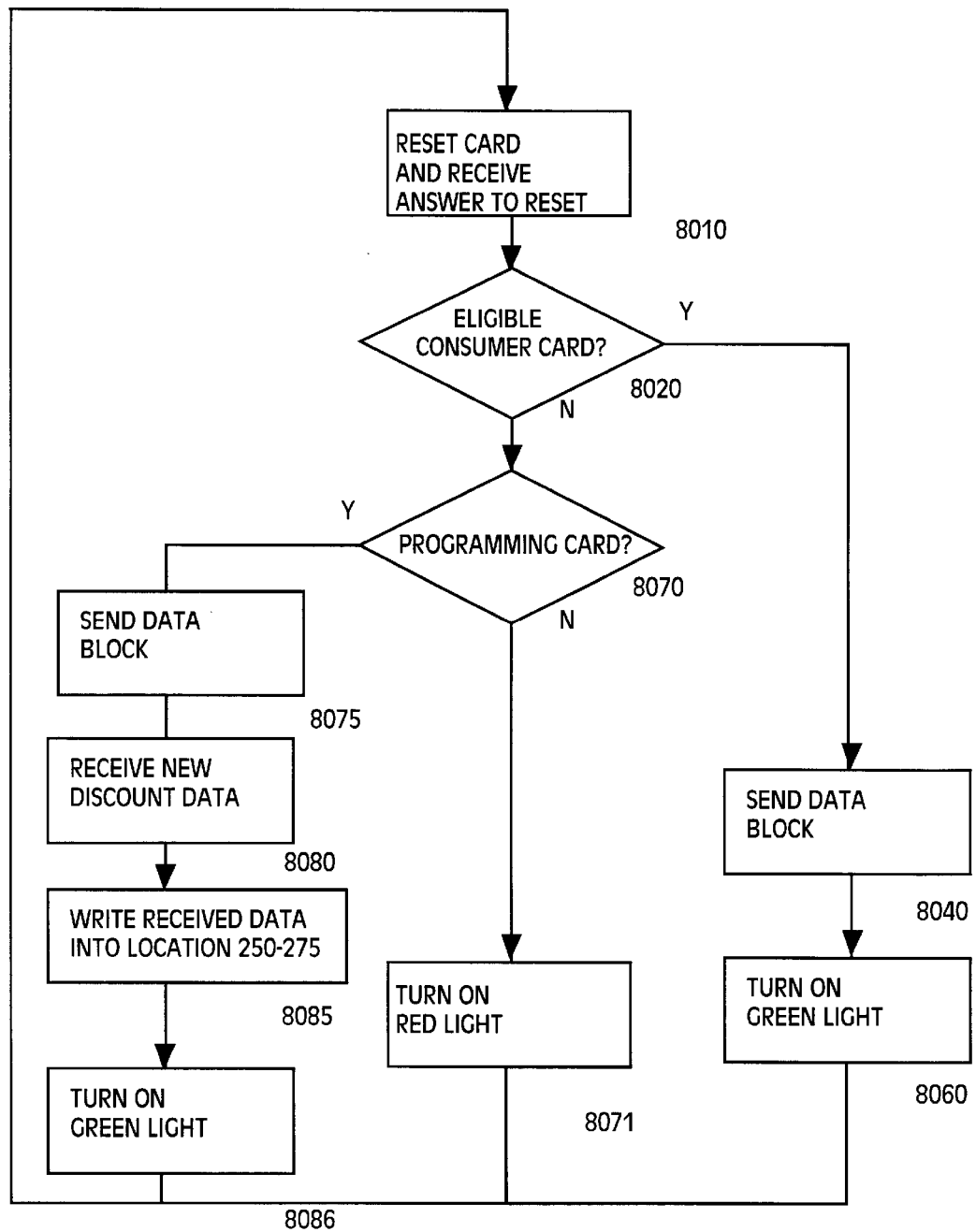
FIG. 8 a flow chart of a processing performed by one of the product stations.

FIG. 8 shows a processing performed by processor 5160 and program 5145 in product station 115. CPU 5160 and a program in memory 5165 act to perform the processing shown in FIG. 8. When a person inserts a card into interface slot 4170 a switch (not shown) in interface slot 4170 alerts CPU 5160 that a card has been inserted into the slot. Subsequently, CPU 5160 causes card interface 4170 to reset the card by applying a clock signal to contact 2423. (If the card is a customer card, the card then answers the reset by sending a block of data, including identification data 2467 and authorization data 2468, through card contact 2427. Authorization data 2468 contains a card-type code indicating a customer card. If the card is a programming card, the card send then answers the reset by sending a data block, including authorization data 2458, through card contact 2427. Authorization data 2458 has a card-type code indicating a programming card.) CPU 5160 then receives then receives the answer-to-reset data block from the card (step 8010).

The communication protocol between product station 115 and a customer card is described in more detail in ISO/IEC 7816-3: 1989 (E), Identification cards—Integrated circuit(s) cards with contacts—Part 3: Electronic signals and transmission protocols; and ISO/IEC 7816-3: 1989/Amd.1: 1992 (E), Part 3: Electronic signals and transmission protocols, AMENDMENT 1: Protocol type T=1, asynchronous half duplex block transmission protocol. Both of these standards are promulgated by the International Organization for Standardization (ISO) and distributed by the American National Standards Institute (ANSI).

CPU 5160 analyzes the authorization data in the received answer-to-reset block to determine whether the card is a customer card that is eligible to receive paperless coupons in store 1000 (step 8020). CPU 5160 determines that the card is a customer card if the received authorization data contains a card-type code indicating a customer card. If the card is a customer card, meaning that the authorization data is authorization data 2468, CPU 5160 determines if the card is eligible to receive paperless coupons in store 1000 if authorization data 2468 contains a store code indicating store 1000, and the current time and date (as indicated by a date-time clock inside processor 4160) is not later than the date data in authorization data 2468. If the card is an eligible customer card, CPU 5160 sends to the customer card a block containing a station-type code indicating a product station, and product coupon data 5135 from locations 250–275 (step 8040). Product coupon data 5135 includes an identification code for the product currently being promoted by the product station (bottles of ammonia 112) and the discount currently being offered for that product. CPU 5160 then turns on green light 4160 to indicate to the customer that an electronic coupon has successfully been transferred to her customer card (step 8060), thereby allowing the customer to conveniently verify whether she is eligible for a discount before selecting the product.

FIG. 9A shows some the contents list 2435 in starting at location 30 memory 2460 of customer card 215, before CPU 5160 of the product station executes step 8040. An electronic coupon is represented by three rows in list 2435: a 12 digit UPC product code in the first row, discount format data in the second row ("1" signifying cents "2" signifying percentage), and discount quantity data in the third row. In FIG. 9A, the customer card is storing two electronic coupons in a list starting at location 30 in memory 2460, reflecting the fact that customer 210 has received electronic coupons from two product stations during her current visit to store 1000. After CPU 5160 executes step 8040 (thereby sending an electronic coupon to the customer card), CPU 2450 in customer card 215 receives the data and adds the data to list 2435, resulting in three electronic coupons in list 2435 as shown in FIG. 9B.

CPU 5160 determines that the card is a programming card if the card-type code in the received authorization data indicates a programming card. If the card is not a an eligible customer card but is instead a programming card meaning that the authorization data is authorization data 2458 (step 8070), CPU 5160 sends to a block containing a station-type code indicating a product station (step 8075), and CPU 5160 receives additional data from the card (step 8080) and changes product data 5135 by writing the additional data to locations 250–275 (step 8085), thereby changing the electronic coupon dispensed by the product station.

If the card is an ineligible customer card, CPU 5160 turns on red light 4155 to notify the consumer that she did not receive a discount for the product.

FIG. 10A shows product data 5135 before the execution of step 8085, and FIG. 10B shows product data 5135 after step 8085. The data starting at location 250 stores identification for a product. In this example product code "345678901200" corresponds to the UPC code on ammonia bottles 112. Location 274 stores the format of the discount quantity data, with "1" signifying cents and "2" signifying percentage in tenths of a percent. Location 275 stores the discount quality data. In FIG. 10A, because location 275 is storing a 50, the discount being offered for ammonia bottles 112 is 50 cents. In FIG. 9B, the discount being offered for another product is 100 cents.

Figure 11:
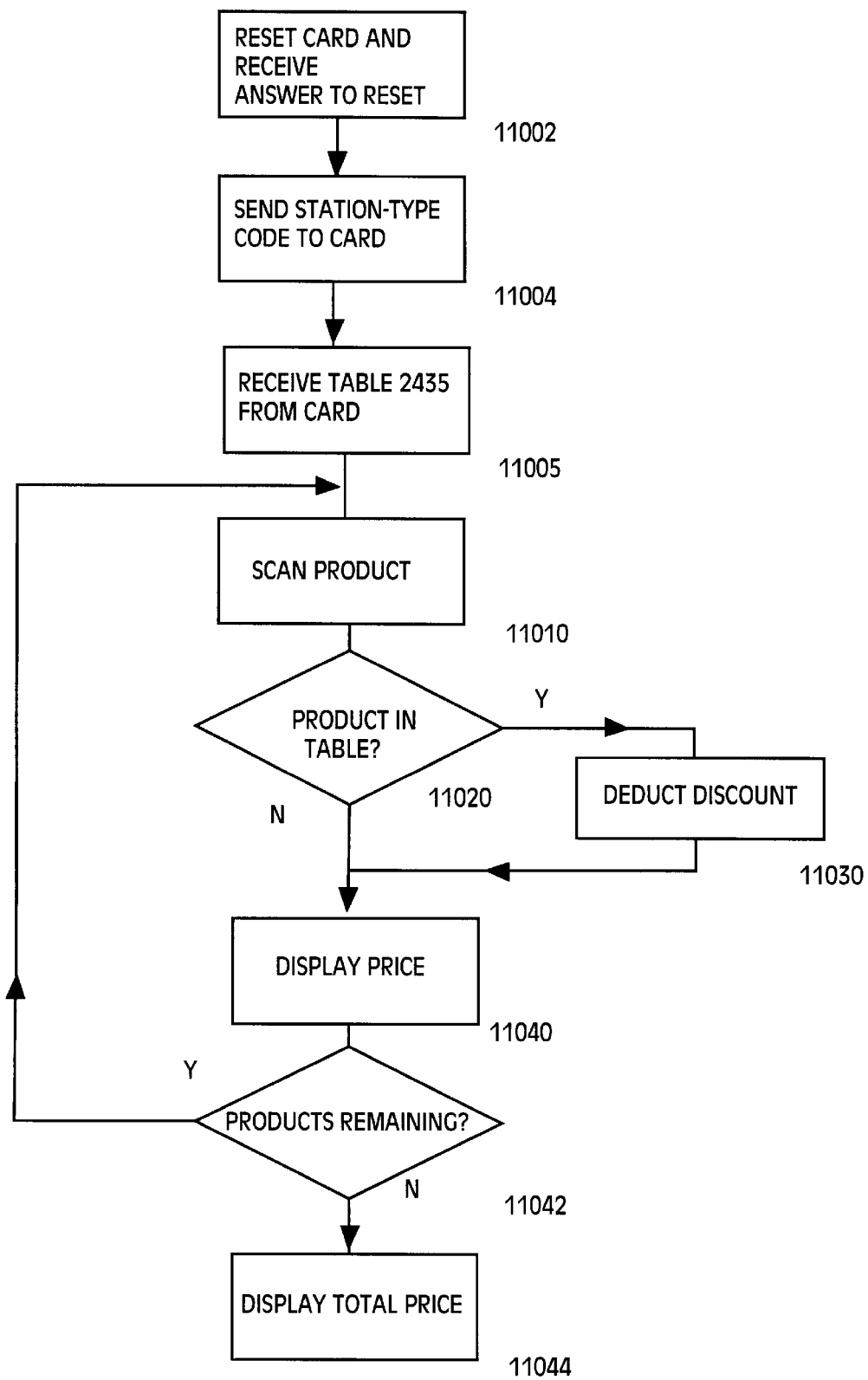
FIG. 11 is a flow chart of a processing performed by the check-out station.

FIG. 11 shows a processing performed by CPU 750 and program 722 in checkout counter 700, when a customer checks out of store 1000. When a customer, such as customer 290, inserts customer card 295 into interface slot 714, a switch (not shown) in interface slot 714 alerts CPU 750 that a card has been inserted into the slot. When a customer card is in interface slot 714, conductive contacts (not shown) inside interface slot 714 touch each card contact 2420. Subsequently, CPU 750 causes card interface 725 to reset the card by applying a clock signal to card contact 2423. (If the card is a customer card, the card then answers the reset by sending a block of data, including identification data 2467 and authorization data 2468, through card contact 2427.) CPU 750 then receives the answer-to-reset from the card (step 11002). CPU 750 then sends a data block containing a station-type code indicating a checkout station (step 11004). CPU 750 then receives the contents of table 2435 in memory 2460 of the customer card, and temporarily stores these table contents in memory 720 of the checkout station (step 11005). During step 10005, CPU 750 also causes customer card 295 to remove all entries from list 2435, so that the electronic coupons in the list cannot be redeemed again. When the checkout clerk (not shown) moves a product past UPC reader 710, UPC reader 710 detects the UPC code on the product and sends the UPC code to CPU 750 (step 11010). CPU 750 searches the received table contents to determine whether the product scanned is identified in the table (step 11020). If the product is in the received table, CPU 750 subtracts the discount, as determined by the discount data stored in the received table, from a product reference price read from disk 725 (step 11030), and displays the resulting price of the product on display 717 (step 11040).

Product data 5135, customer identification data 2467, authorization data 2468, and the data in list 2435 are each a type of signal.

In other words, the preferred retail system 1000 includes product areas 110, 120, 130, 140, 160, 170, 180, and 190; product stations 115, 125, 135, 145, 165, 175, 185, and 195 acting as a plurality of first communication ports each adjacent to a respective one of the product areas, a plurality of customer cards each having a memory, and a checkout counter 700 having checkout station 715 acting as a second communication port. A method of operating system 1000 comprises the steps of writing a first signal into memory 2460 of a card in the plurality of cards, in response to a person inserting the card into the interface slot of one of the product stations, the first signal identifying a product in the product area adjacent to the one of the first communication ports; reading the first signal from memory 2460, in response to a person inserting the card into the interface slot of the checkout station; receiving a second signal, from UPC reader 710, identifying a product; and determining a price for the product depending on whether the product identified by the first signal, read in the reading step, corresponds to the product identified by the second signal.

In summary, after UPC barcode reader 710 scans a product, processor 750 determines eligibility for a discount. If a product qualifies, processor 750 displays the discounted price on display 717. Periodically, electronic coupon data is processed and reported to a clearing house.

Figure 12:
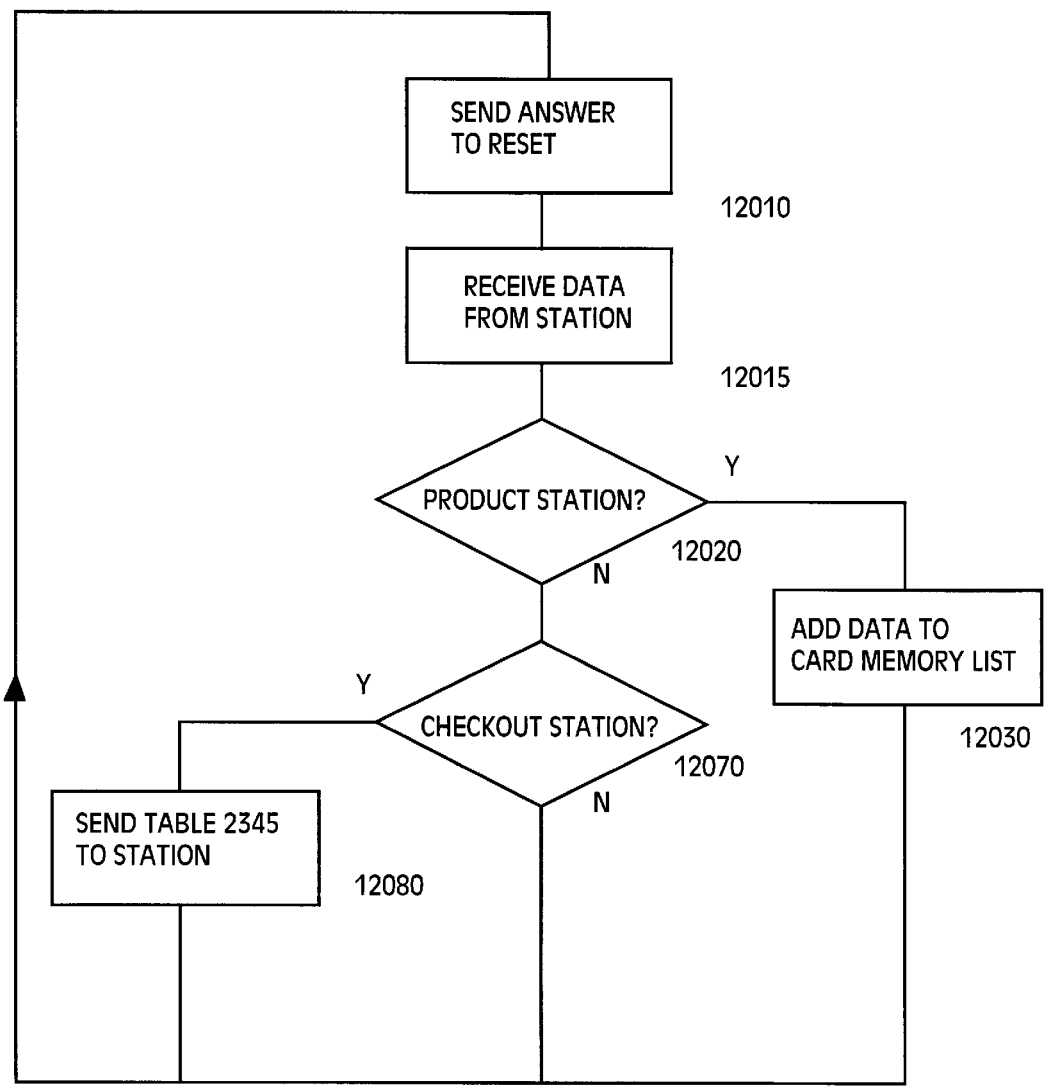
FIG. 12 is a flow chart of a processing performed by one of the customer cards.

FIG. 12 shows a processing performed by one of the customer cards, such as customer card 215, in the preferred retail system. After the card is reset through contacts 2420, the customer card sends an "answer to reset" data block in accordance with the ISO standard ISO/IEC 7816-3: 1989 (E), cited above. The customer card sends identification data 2467 and authorization data 2468 in the answer-to-reset data block (step 12010). If the station then sends a block of data to the customer card, the customer card then receives the block of data through contact 2427 (step 12015). If the block contains a station-type code indicating a product station (step 12020), the customer card then adds product coupon information, from a certain location in the block, to the list 2345 (step 12030).

If the customer card is not eligible, the station will not send a block of data, step 12015 therefore does not execute, and processing ceases until the customer card is reinserted into a station, at which time the station will reset the card and processing will restart at step 12010.

Alternatively, if the block contains a station-type code indicating a checkout station (step 12070), the customer card then sends list 2345 to the checkout station (step 12080). In other words, CPU 2450 reads list 2435 from memory 2460, in response to a customer inserting card 215 into checkout station 715, and sends a signal corresponding to the list 2345 to the checkout station (step 12080).

Figure 13:
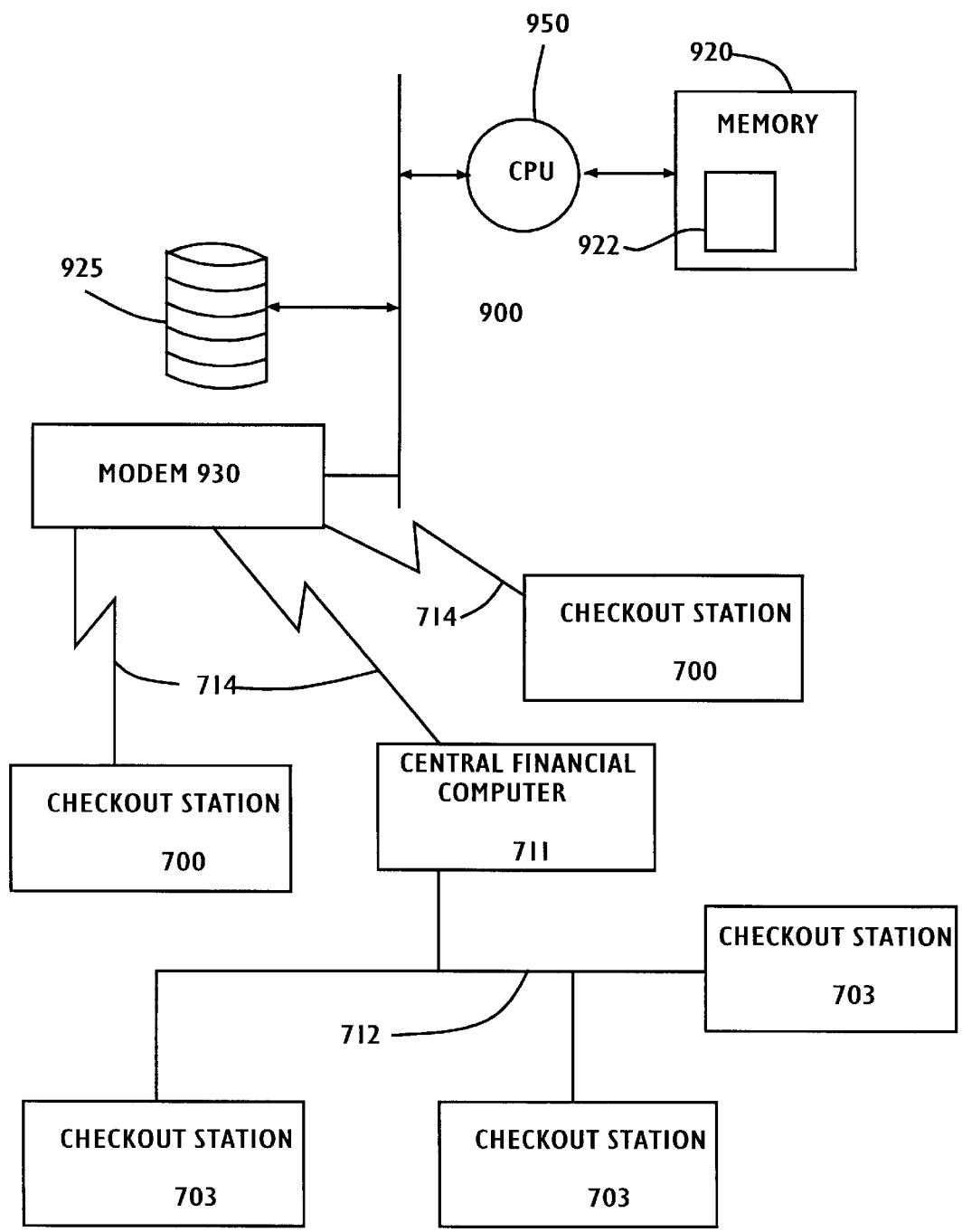
FIG. 13 is a block diagram of a system including a clearing house and multiple check-out stations.

FIG. 13 shows a block diagram of a preferred retail system including a clearinghouse 900, and a plurality of checkout stations 700. Periodically, each checkout station 700 sends a block of data summarizing the redemption transactions. The checkout stations send the data blocks, over telephone lines 714, to clearinghouse 900. The block includes the data shown in Table 1, below.

TABLE 1

| [customer ID 1] | [UPC code 1] |
| [customer ID 2] | [UPC code 2] |
| [customer ID 3] | [UPC code 3] |
| [customer ID 4] | [UPC code 4] |
| [customer ID n] | [UPC code n] |

Each row in table 1 records a redemption transaction. Each customer ID number is a copy of data 2467 from a customer card. Each UPC code is a copy of product data 5135 from one of the product stations.

Clearinghouse memory 925 stores demographic data records. Each record is indexed by customer ID. As shown in Table 2, below, each row represents a demographic record for a customer. The first entity in each row is the record key, or index. The second entity is date of birth, and the third entity is yearly income.

TABLE 2

| [customer ID 1] | March 12, 1944 | 30,100 |
| [customer ID 1] | March 12, 1964 | 23,700 |
| [customer ID 1] | March 12, 1932 | 30,100 |
| [customer ID 1] | March 12, 1905 | 89,000 |
| . | . | . |
| [customer ID n] | December 12, 1975 | 19,100 |

Processor 950 processes transaction data blocks, such as the block shown in Table 1, and uses the customer Ids in the data blocks to access demographic records, such as the record shown in Table 2. Processor 950 then generates a report summarizing certain trends, such as the report shown in Table 3, below.

TABLE 3

ACME AMMONIA COUPON REDEMPTIONS FOR MARCH 1995

| AGE RANGE | TOTAL BOTTLES SOLD WITH COUPON |
|---|---|
| 15–25 | 60,456 (30%) |
| 25–40 | 102,345 (51%) |
| 40–60 | 14,345 (7%) |
| over 60 | 23,456 (12%) |
| all ages | 200,602 (100%) |

Checkout stations 703 are located within a single company. Checkout stations 703 are similar to checkout stations 700, described above, except that checkout stations 703 have circuitry for communicating over network 712. Checkout stations 703 send transaction data blocks to central financial computer 711 located within the company. Central financial computer 711 periodically sends the compiled transaction data to clearing house 900, over telephone lines 714.

In other words, the system shown in FIG. 13, and the corresponding product stations, perform a method of determining retail buying patterns. The method writes demographic data, obtained from a customer application questionnaires described above, into memory 925. The method writes personal identification data 2467 onto customer cards. Subsequently, one or more product stations writes a product identification data, corresponding to a selected product, onto certain ones of the cards. Subsequently, a checkout station reads the personal identification data 2467 from certain ones of the cards to generate a first read signals, and reads the product identification data from certain ones of the cards to generate second read signals. These first and second signals are sent to clearinghouse 900, which generates a report using the first and second signals. Clearinghouse 900 generates the report by accessing the demographic data, using the first signal, to generate a demographic signal; and by correlating the demographic signal (indicating age) with the second signal (purchases of ammonia).

Figure 14:
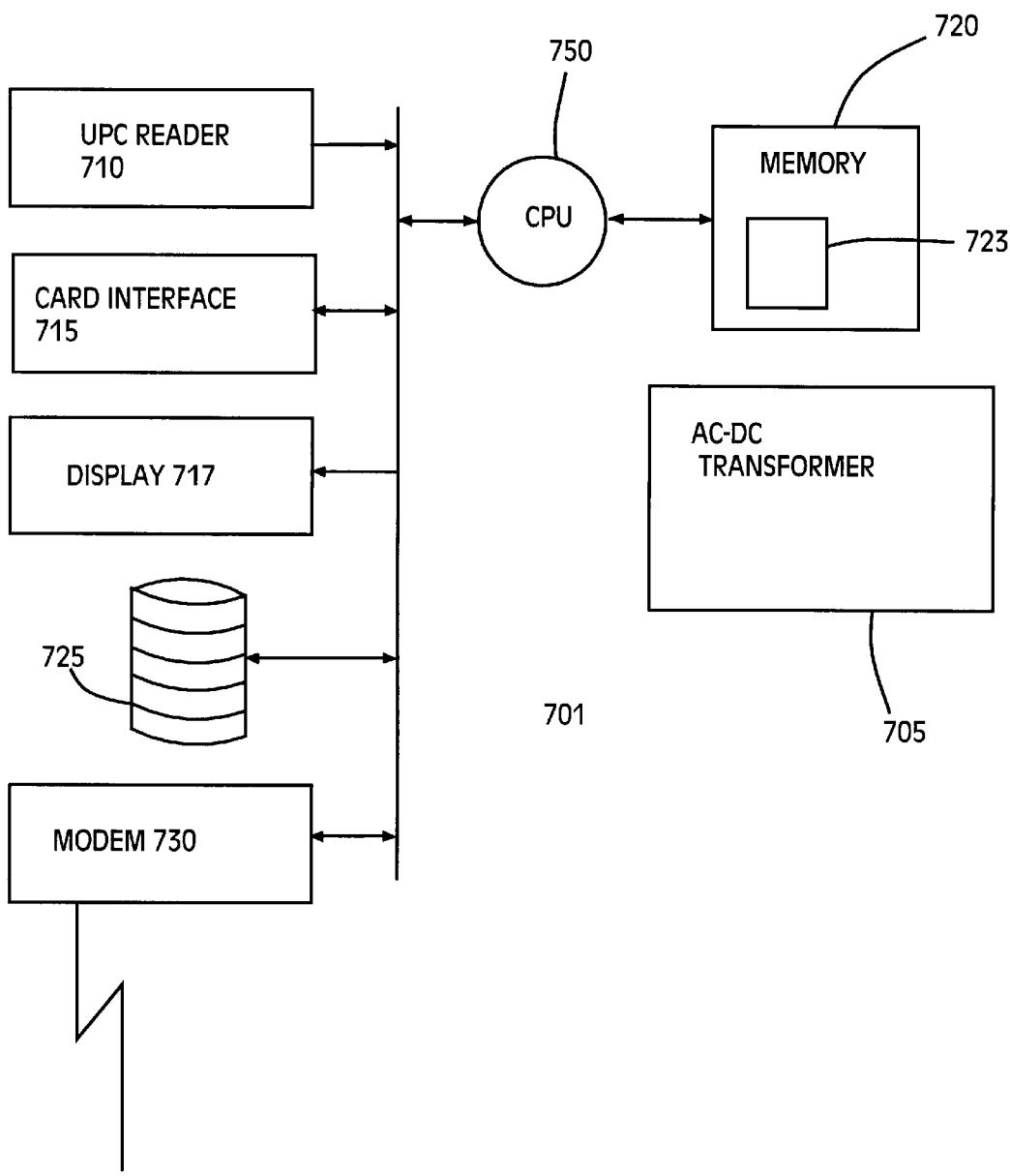
FIG. 14 is a block diagram of a check-out counter in accordance with an alternative embodiment of the present invention.

FIG. 14 is a block diagram of checkout counter 701 in accordance with an alternative embodiment of the present invention. Checkout counter 701 is similar to checkout counter 700 shown in FIG. 7, except that checkout counter 701 has program 723.

Figure 15:
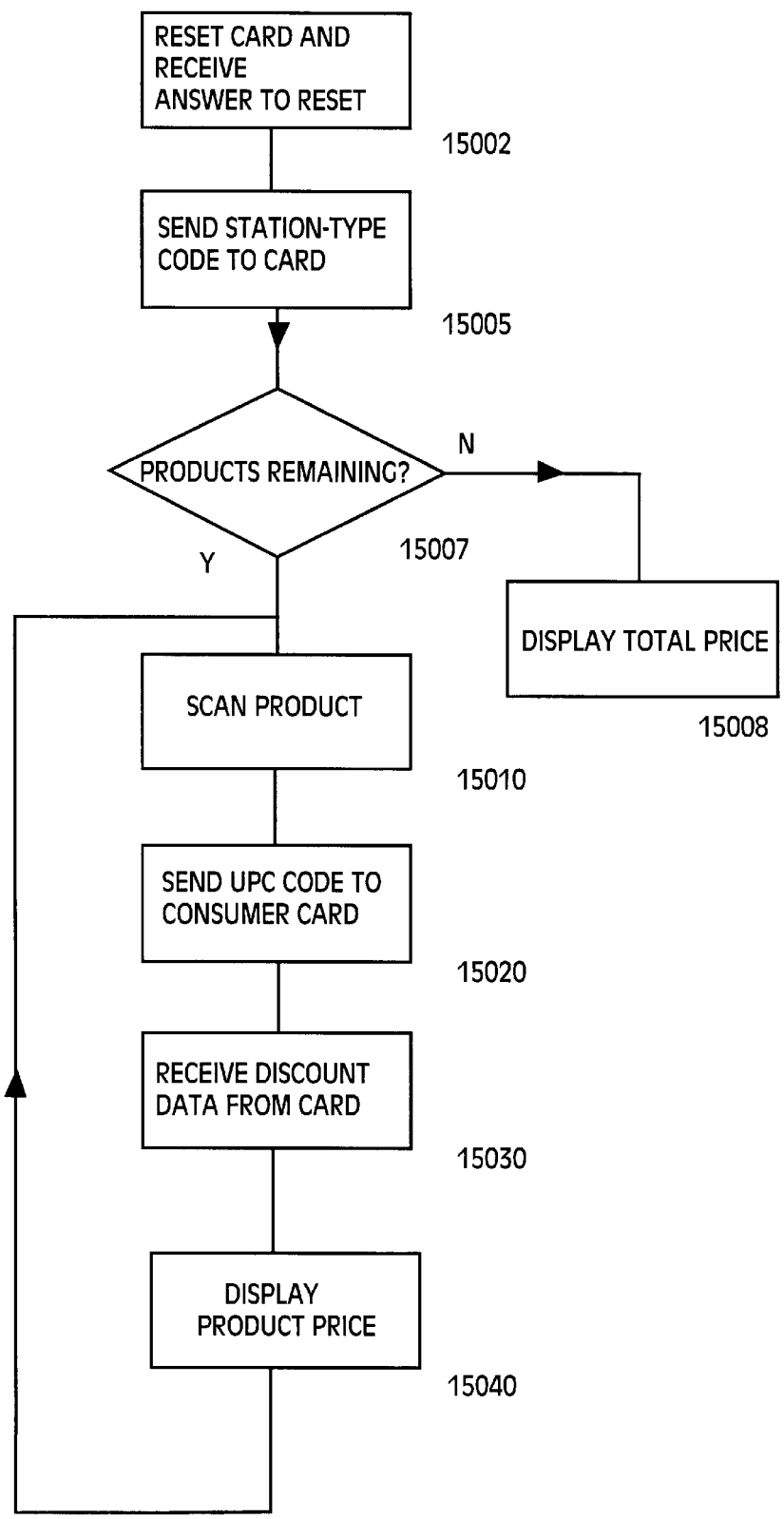
FIG. 15 is a flow chart of a processing performed by the check-out station shown in FIG. 12.

FIG. 15 shows a flow chart of a processing performed by CPU 750 and program 723 in checkout counter 701. When a customer, such as customer 290, inserts customer card 295 into interface 715, CPU 750 causes card interface 750 to reset the card (step 15002). CPU 750 then sends a block of data containing a station-type code indicating a checkout station (step 15005). If there are no product remaining to be scanned (step 15007), the checkout clerk (not shown) presses the "total" button 719 on cash register 718, causing CPU 750 to display the total price (accumulated from step 15040) on display 717, and to send the card a data block containing zero in the first word (step 15008). If there are products remaining (step 15007), the clerk moves a product past UPC reader 710, UPC reader 710 detects the UPC code on the product and sends the UPC code to CPU 750 (step 15010). CPU 750 then sends a data block to the card, with the UPC code stored at the first word of the data block (step 15020). In other words, CPU 750 sends a UPC signal, identifying a product, to the card. CPU 750 then receives a data block containing discount data from the card (step 15030) and displays the resulting price of the product on display 717 (step 15040). The received discount data will either be 0, signifying that there is no coupon corresponding to the UPC code sent to the card, or will be non-zero data consisting of the discount format and quantity data, described above in connection with FIGS. 9A and 9B, corresponding to the UPC code.

Figure 16:
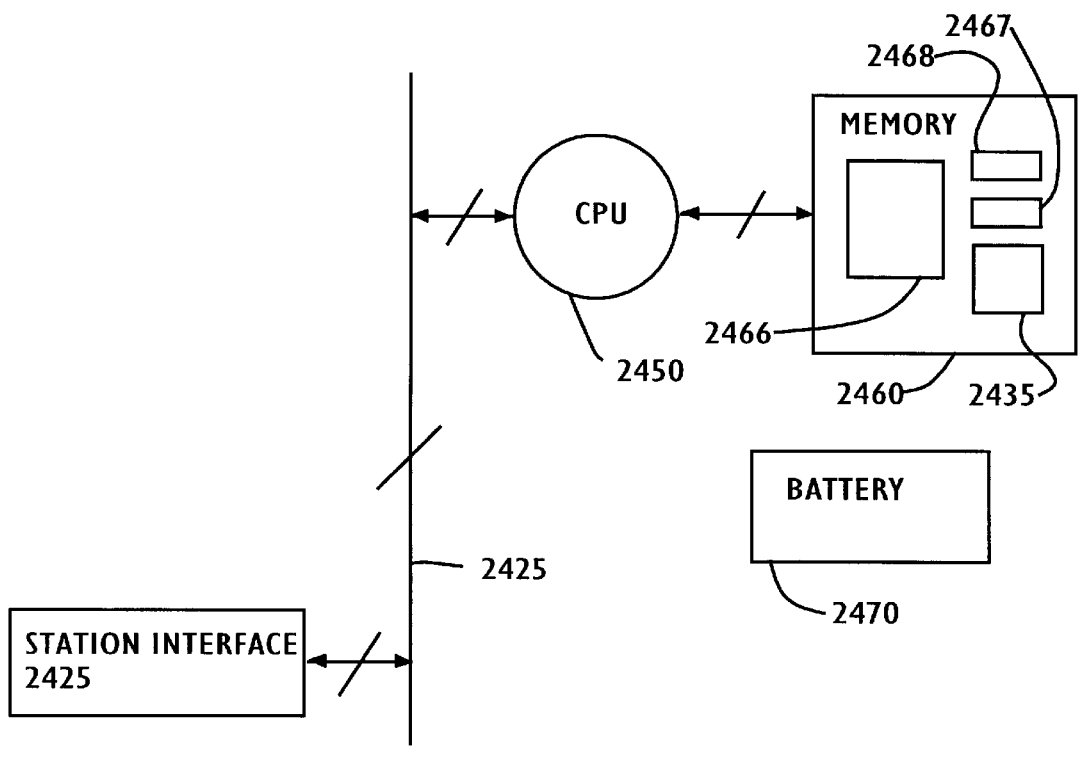
FIG. 16 is a block diagram of a customer card according to an alternative embodiment of the present invention.

FIG. 16 shows customer card 216 in accordance with the alternative embodiment of the present invention. Customer card 216 is similar to customer card 215 described above, except that customer card 216 has program 2466 in memory 2460.

Figure 17:
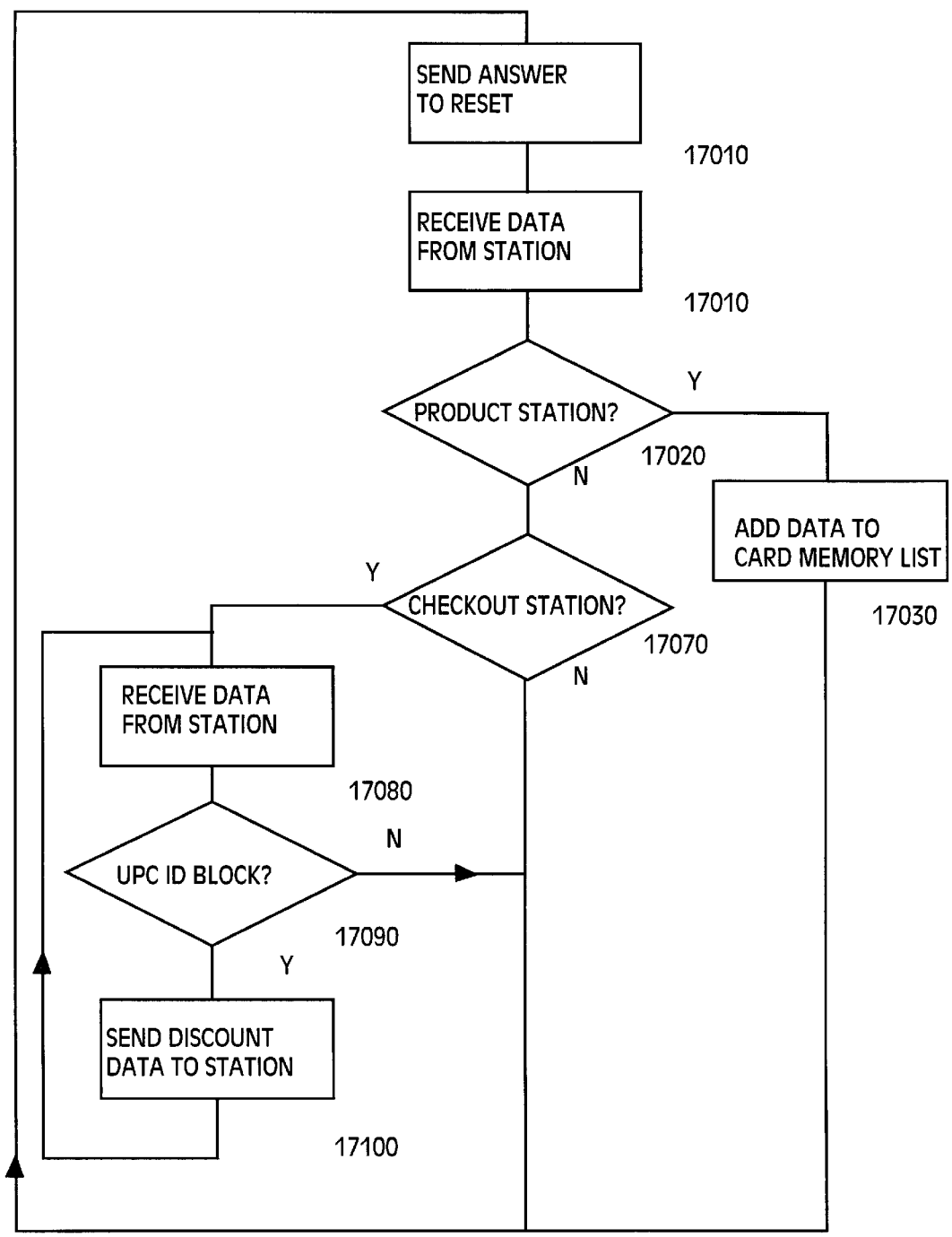
FIG. 17 is a flow chart of a processing performed by the customer card shown in FIG. 14.

FIG. 17 shows a processing performed by CPU 2450 and program 2466. After the card is reset through contacts 2420, the customer card sends an "answer to reset" data block in accordance with the ISO standard ISO/IEC 7816-3: 1989 (E), cited above. The customer card also sends data identifying the card (step 17010). The customer card then receives a block of data through contact 2427 (step 17015). If the block contains a station-type code indicating a product station (step 17020), the customer card then adds product coupon information, from a certain location in the block, to the list 2345 (step 17030). Alternatively, if the block contains a station-type code indicating a checkout station (step 17070), the customer card then receives another block from the station (step 17080). If the first word in the block is non-zero, there is a UPC code stored in the block (step 17090). The card searches list 2345 for this UPC code, sends the station a block containing a zero in the first word if the UPC code is not in table 2345, or sends the station a block containing the discount format and discount quantity data corresponding to the UPC code if the UPC code is in table 2345. Processing then returns to step 17080.

If the first word in the block received in step 17080 is zero (indicating that the last product has been scanned), the card then exits the loop of steps 17080, 17090, and 17100, and processing returns to step 17010.

An advantage of the alternative embodiment of the invention is that the software in the checkout station need only send UPC codes to the customer card and receive discount data from the customer card, allowing the invention to be practiced using relatively simple modifications to conventional checkout station software. Further, the integrity of the conventional checkout station is assured since no complicated foreign software need be intermingled with the conventional checkout station software.

A variation of the alternative embodiment is to have the customer card receive UPC codes from the checkout station as described above, but defer sending discount data to the checkout station until the last product is scanned. After the last product is scanned, the customer card would then send a list of UPC codes, with respective discount data for each UPC code, to the checkout station.

In FIG. 1B, service worker 50 carries a programming card 55 for reprogramming the product stations. The hardware architecture of service card 55 is the same as the architecture of customer card 115, discussed above. The software in the memory of service card 55, however, is different than the software in the customer cards. Service card 55 has software to allow the product station to recognize that service card 55 is authorized to alter the memory contents of the product stations, as discussed in more detail below. Programming card 55 has a memory containing discount data for a product.

In other words, product station includes an electrical contact 4177. The writing step, described above, communicates between a customer card and a product station through electrical contact 4177. The preferred method also includes a step of changing the selected product by sending a programming signal from the programming card 55 to the product station through electrical contact 4177.

In other words, service worker 55 creates a signal path to one of the product stations by inserting programming card 55 into the interface slot of the product station. The programming card then changes the selected product by sending a programming signal to the product station through contact 4177. Service worker 55 then breaks the signal path by removing programming card 55.

Figure 18:
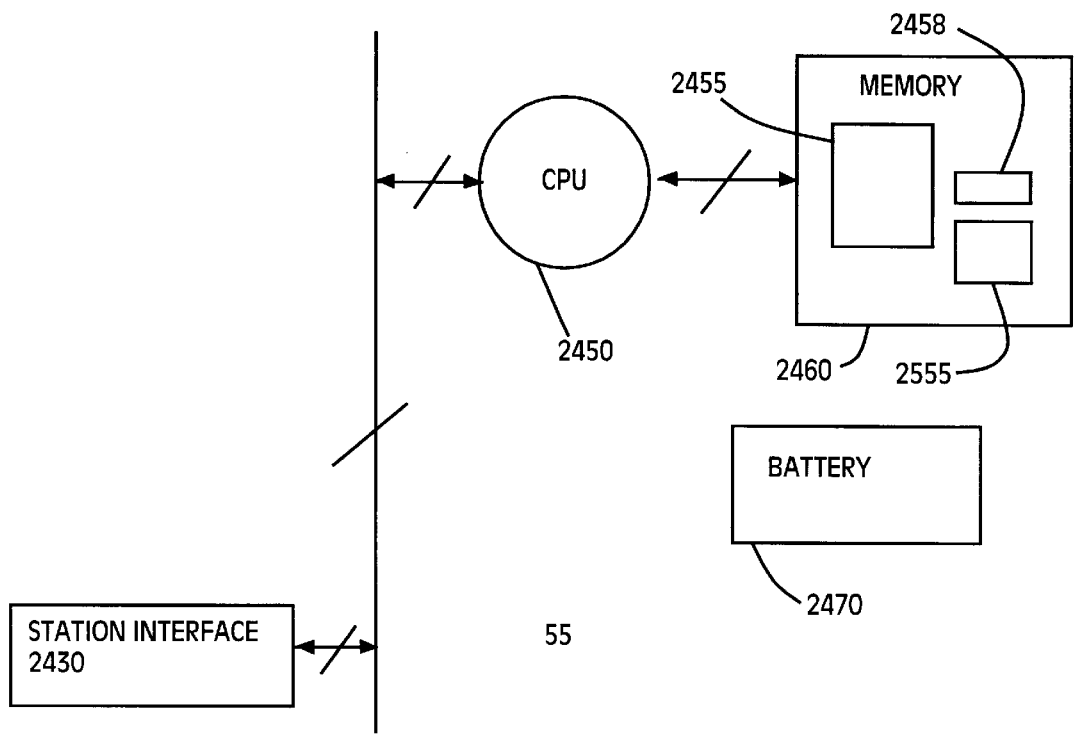
FIG. 18 is a block diagram of a programming card in the preferred system.

FIG. 18 shows a block diagram of a programming card 55 in accordance with the preferred embodiment of the present invention. Programming card 55 is similar to customer card 215, except that programming card has program 2455, authorization data 2458, and new discount data 2555 in addressable, random access memory 2460. Authorization data 2458 and new discount data 2555 are each a type of signal.

Figure 19:
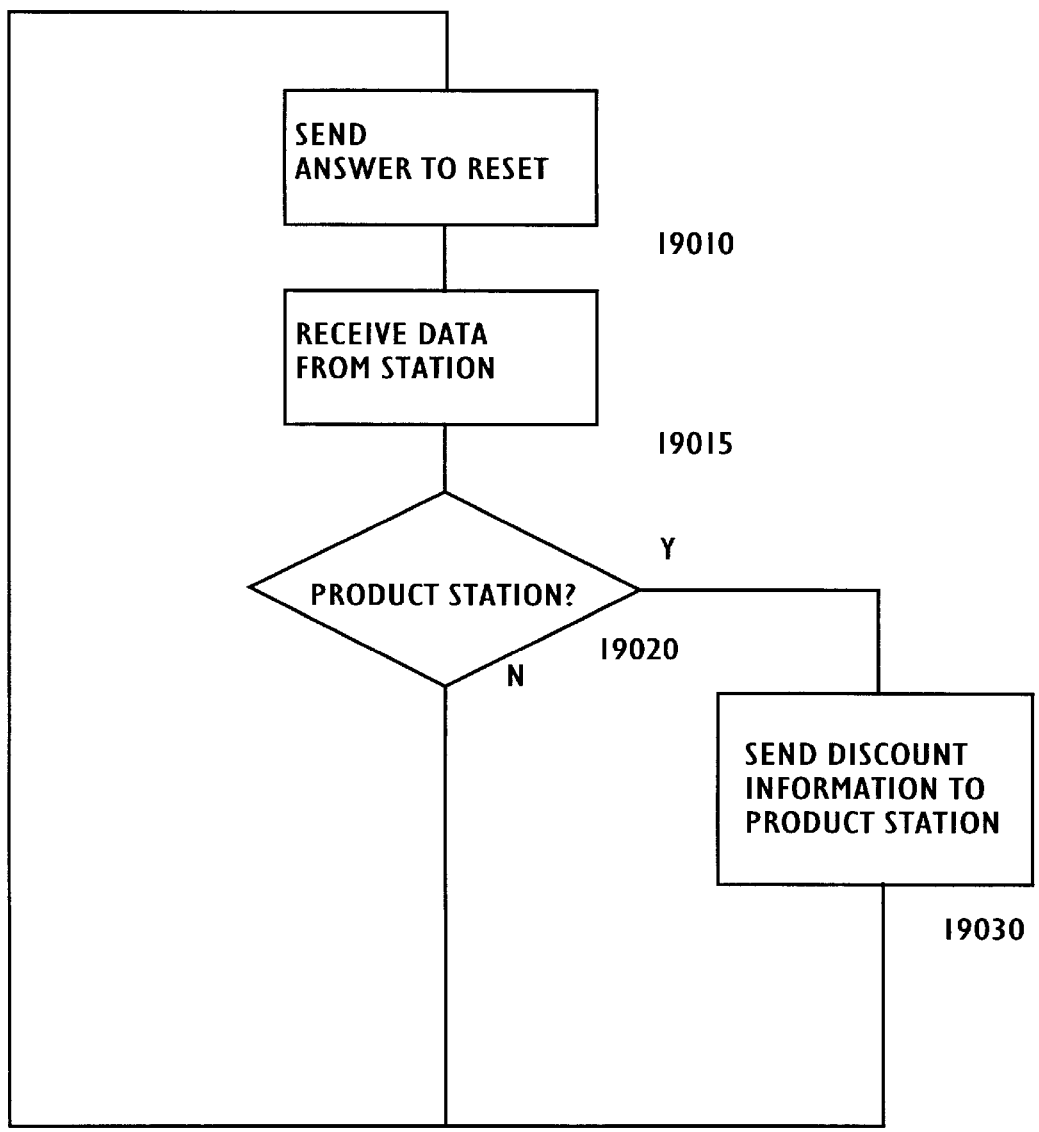
FIG. 19 is a flow chart of a processing performed by the programming card.

FIG. 19 shows a processing performed by CPU 2450 and program 2455 in program card 55. After programming card 55 is reset through contacts 2420, programming card 55 sends authorization data 2458 in an answer-to-reset data block in accordance with the ISO standard ISO/IEC 7816-3: 1989(E), cited above (step 19010). Authorization data 2458 has a card-type code indicating that the card is a programming card. Programming card 55 then receives a block of data through contact 2427 (step 19015). If the block contains a station-type code indicating a product station (step 19020), the programming card 55 card then sends discount data 2555 (step 19030).

Thus, the preferred system provides a convenient and stimulating shopping environment without requiring an elaborate hardware configuration throughout the store. The product stations of the preferred system may be compact, because the product stations need not have paper transport mechanisms to print paper coupons. This compactness allows the product stations to be placed adjacent to the corresponding products.

Demographic data and redemption data, compiled by the checkout station, provide manufactures with timely feedback about the effectiveness of product promotion programs. The potential for coupon fraud and misredemption is reduced, as each coupon is ultimately traceable to an individual customer.

Although the illustrated portable customer card and portable programming card are each 8.5 cm long by 5.4 cm wide, the invention may be practices with other portable card dimensions. Preferably the portable card dimension is less than 15 cm long by 10 cm wide.

Although the preferred system employs a programming card, having an interface compatible with the customer card interface on each product station, the invention may be practiced with other types of programming interfaces, disengaged from the product station except when programming is performed. For example, instead of a programming card, a service worker may carry a portable computer that temporarily connects to the product station with a cable. With this cable scheme, the service worker creates a signal path to the product station by plugging the cable into the product station. The portable computer then changes the selected product by sending a programming signal through the cable to the product station. Subsequently, the service worker breaks the signal path by disconnecting the cable from the product station.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A method for a system including a plurality of portable cards transported by consumers, each card including a flat substrate, and a memory for storing a plurality of signals corresponding to pricing information for a plurality of products, and a store including a plurality of areas each including
      a shelf,
      a plurality of units of a respective product, the plurality of units being on the shelf, the plurality of units having a common symbol different than a symbol of units of another product, the system further including
      a plurality of interfaces, each including an interface junction from which signals exit the interface, the method comprising the steps, performed for each interface, of:

storing a respective first signal, in the interface;

detecting, in the interface, a card in the plurality of cards, the detecting step being performed after the storing step, at time when the interface is supported by a shelf in a respective one of the plurality of areas and located adjacent to the plurality of units of the respective product such that no units of another product are between the interface and the plurality of units; and sending the stored first signal through the interface junction to the card detected in the previous step, at a time when the interface is supported the shelf and the respective first signal corresponds to pricing information for the product represented by the units adjacent to the interface, the sending step being performed for multiple cards per performance of the storing step.

2. The method of claim 1 wherein the storing step is performed at a time when the interface is supported the shelf.

3. The method of claim 1 wherein sending is performed at a time when the card is touching the interface.

4. The method of claim 1 wherein each of the plurality of cards further includes a card electrical contact and the interface junction of each of the plurality of interfaces includes an interface electrical contact, and sending includes sending a current from the interface electrical contact to the card electrical contact.

5. The method of claim 1 further including the step, performed for each interface, of receiving, in the interface, a multi-digit signal from the card, the receiving step being performed after the detecting step.

6. The method of claim 5 wherein each interface includes a battery for powering the interface, and the step of sending the recorded first signal is performed while powering the interface from the battery.

7. The method of claim 5 wherein each interface includes a battery for powering the interface and has no external wires connecting the interface to another device, and the step of sending the recorded first signal is performed while powering the interface from the battery.

8. The method of claim 1 wherein each interface includes a battery for powering the interface, and the step of sending the recorded first signal is performed while powering the interface from the battery.

9. The method of claim 1 wherein each interface includes a battery for powering the interface and has no external wires connecting the interface to another device, and the step of sending the recorded first signal is performed while powering the interface from the battery.

10. The method of claim 1 wherein each interface includes an electronic memory and the storing step includes the step of writing the first signal into the electronic memory.

11. The method of claim 1 wherein each interface includes a random access memory and the storing step includes the step of writing the first signal into the random access memory.

12. A system for operating with a plurality of portable cards transported by consumers, each card including a flat substrate, and a memory for storing a plurality of signals corresponding to pricing information for a plurality of products, and a store having a plurality of areas each including a shelf, a plurality of units of a respective product, the plurality of units being on the shelf, the plurality of units having a common symbol different than a symbol of units of another product, the system comprising:
    a plurality of interfaces, each interface including
        an interface junction from which signals exit the interface,
        a storage device for storing a respective first signal,
        a detector that detects a card in the plurality of cards, at a time when the respective first signal is in the storage device and the interface is supported by a shelf of one of the areas in the store and located adjacent to the plurality of units of the respective product such that no units of another product are between the interface and the plurality of units, and
        a sender that sends a signal through the interface junction to a card detected by the detector, at a time when the interface is supported by a shelf and the first signal corresponds to pricing information for the product represented by the units adjacent to the interface; and
    a programmer that programs the storage device of an interface with the respective first signal, wherein the sender of the interface is activated for multiple cards per activation of the programmer.

13. The system of claim 12 wherein the programmer is in the store.

14. The system of claim 12 wherein each interface further includes a receiver that receives, at a time when the respective first signal is in the storage device, a multi-digit signal from the card in the plurality of cards.

15. The system of claim 14 wherein each interface has no external wires connecting the interface to another device.

16. The system of claim 14 wherein each interface includes a battery for powering the sender.

17. The system of claim 14 wherein each interface includes a battery for powering the interface and has no external wires connecting the interface to another device.

18. The system of claim 12 wherein each interface includes a battery for powering the interface.

19. The system of claim 12 wherein each interface includes a battery for powering the interface and has no external wires connecting the interface to another device.

20. The system of claim 12 wherein each the storage device, in each of the plurality of interfaces, includes an electronic memory.

21. The system of claim 12 wherein each the storage device, in each of the plurality of interfaces, includes a random access memory.

22. The system of claim 21 wherein each interface further includes a receiver that receives, at a time when the respective first signal is in the storage device, a multi-digit signal from the card in the plurality of cards.

23. The system of claim 12 wherein the interface junction is for touching the card.

24. The system of claim 12 wherein each of the plurality of cards further includes a card electrical contact and the interface junction of each of the plurality of interfaces includes an interface electrical contact for sending a current from the interface electrical contact to the card electrical contact.

25. A system for operating with a plurality of portable cards transported by consumers, each card including a flat substrate, and a memory for storing a plurality of signals corresponding to pricing information for a plurality of products, and a store having a plurality of first areas each including a shelf, a plurality of units of a respective product, the plurality of units being on the shelf, the plurality of units having a common symbol different than a symbol of units of another product, and a checkout area, spatially removed from the plurality of first areas, the system comprising:
    a plurality of interfaces, each interface including
        an interface junction from which signals exit the interface,
        a storage device for storing a respective first signal,
        a detector that detects a card in the plurality of cards, at a time when the respective first signal is in the storage device and the interface is supported by a shelf of one of the first areas in the store and located adjacent to the plurality of units of the respective product such that no units of another product are between the interface and the plurality of units, and
        a sender that sends a signal through the interface junction to a card detected by the detector, at a time when the interface is supported by a shelf and the first signal corresponds to pricing information for the product represented by the units adjacent to the interface;
    a programmer that programs the storage device of an interface with the respective first signal, wherein the sender of the interface is activated for multiple cards per activation of the programmer; and
    the following elements, located in the checkout area:
        a receiver for receiving signals corresponding to pricing information from the memory of the card, in the plurality of cards;
        an electromagnetic detector for generating a second signal corresponding to a product;

a receiver for receiving the second signal; and a price determiner for determining a price depending on whether the second signal corresponds to one of the received signals corresponding to pricing information.

26. The system of claim 25 wherein the programmer is in the store.

27. The system of claim 25 wherein each interface further includes a receiver that receives, at a time when the respective first signal is in the storage device, a multi-digit signal from the card in the plurality of cards.

28. The system of claim 27 wherein each interface has no external wires connecting the interface to another device.

29. The system of claim 27 wherein each interface includes a battery for powering the interface.

30. The system of claim 27 wherein each interface includes a battery for powering the interface and has no external wires connecting the interface to another device.

31. The system of claim 25 wherein each interface includes a battery for powering the interface.

32. The system of claim 25 wherein each interface includes a battery for powering the interface and has no external wires connecting the interface to another device.

33. The system of claim 25 wherein each the storage device, in each of the plurality of interfaces, includes an electronic memory.

34. The system of claim 25 wherein each the storage device, in each of the plurality of interfaces, includes a random access memory.

35. The system of claim 34 wherein each interface further includes a receiver that receives, at a time when the respective first signal is in the storage device, a multi-digit signal from the card in the plurality of cards.

36. The system of claim 25 wherein the interface junction is for touching the card.

37. The system of claim 25 wherein each of the plurality of cards further includes a card electrical contact and the interface junction of each of the plurality of interfaces includes an interface electrical contact for sending a current from the interface electrical contact to the card electrical contact.

38. The system of claim 25 further including:

a reader for reading a third signal identifying a person; and a generator for generating a fourth signal by processing the first, second, and third signals.

39. A system for operating with a store and a plurality of portable cards transported by consumers, each card including a flat substrate, and a memory for storing a plurality of signals corresponding to pricing information for a plurality of products, the store including a plurality of areas each including
    a shelf,
    a plurality of units of a respective product, the plurality of units being on the shelf, the plurality of units having a common symbol different than a symbol of units of another product, the system comprising:

a plurality of interfaces, each including
    an interface junction from which signals exit the interface,
    means for holding a respective first signal,
    means for detecting a card in the plurality of cards, at time when the respective first signal is in the holding means and the interface is supported by a shelf in one of the plurality of areas and located adjacent to the plurality of units of the respective product such that no units of another product are between the interface and the plurality of units, and
    means for sending the stored first signal through the interface junction to the card detected in the previous step, at a time when the interface is supported the shelf and the respective first signal corresponds to pricing information for the product represented by the units adjacent to the interface;

means for programming the holding means of an interface with the respective first signal, wherein the sending means of the interface is activated for multiple cards per activation of the programming means.

40. The system of claim 39 wherein the programming means is in the store.

41. The system of claim 39 wherein each interface further includes a receiver that receives, at a time when the respective first signal is in the holding means, a multi-digit signal from the card in the plurality of cards.

42. The system of claim 41 wherein each interface has no external wires connecting the interface to another device.

43. The system of claim 41 wherein each interface includes a battery for powering the interface.

44. The system of claim 41 wherein each interface includes a battery for powering the interface and has no external wires connecting the interface to another device.

45. The system of claim 39 wherein each interface includes a battery for powering the interface.

46. The system of claim 39 wherein each interface includes a battery for powering the interface and has no external wires connecting the interface to another device.

47. The system of claim 39 wherein each the holding means, in each of the plurality of interfaces, includes an electronic memory.

48. The system of claim 39 wherein each the holding means, in each of the plurality of interfaces, includes a random access memory.

49. The system of claim 48 wherein each interface further includes a receiver that receives, at a time when the respective first signal is in the holding means, a multi-digit signal from the card in the plurality of cards.

50. The system of claim 39 wherein the interface junction is for touching the card.

51. The system of claim 39 wherein each of the plurality of cards further includes a card electrical contact and the interface junction of each of the plurality of interfaces includes an interface electrical contact for sending a current from the interface electrical contact to the card electrical contact.

52. A system of operating with a store and a plurality of portable cards transported by consumers, each card including a flat substrate, and a memory for storing a plurality of signals corresponding to pricing information for a plurality of products, the store including a plurality of first areas each including
    a shelf,
    a plurality of units of a respective product, the plurality of units being on the shelf, the plurality of units having a common symbol different than a symbol of units of another product, a checkout area including an electromagnetic detector, spatially removed from the plurality of first areas, the system comprising:

a plurality of interfaces, each including
    an interface junction from which signals exit the interface,
    means for holding a respective first signal,
    means for detecting a card in the plurality of cards, at time when the respective first signal is in the holding means and the interface is supported by a shelf in one of the plurality of areas and located adjacent to the plurality of units of the respective product such that no units of another product are between the interface and the plurality of units, and means for sending the stored first signal through the interface junction to the card detected in the previous step, at a time when the interface is supported the shelf and the respective first signal corresponds to pricing information for the product represented by the units adjacent to the interface;

means for programming the holding means of an interface with the respective first signal, wherein the sending means of the interface is activated for multiple cards per activation of the programming means, means for receiving, in a computer, signals corresponding to pricing information from the memory of the card, in the plurality of cards, carried to the checkout area;

means for generating, in the electromagnetic detector, a second signal corresponding to a product;

means for receiving, in the computer, the second signal; and a price determiner for determining a price depending on whether the second signal corresponds to one of the received signals corresponding to pricing information.

53. The system of claim 52 wherein the programming means is in the store.

54. The system of claim 52 wherein each interface further includes a receiver that receives, at a time when the respective first signal is in the holding means, a multi-digit signal from the card in the plurality of cards.

55. The system of claim 54 wherein each interface has no external wires connecting the interface to another device.

56. The system of claim 54 wherein each interface includes a battery for powering the interface.

57. The system of claim 54 wherein each interface includes a battery for powering the interface and has no external wires connecting the interface to another device.

58. The system of claim 52 wherein each interface includes a battery for powering the interface.

59. The system of claim 52 wherein each interface includes a battery for powering the interface and has no external wires connecting the interface to another device.

60. The system of claim 52 wherein each the holding means, in each of the plurality of interfaces, includes an electronic memory.

61. The system of claim 52 wherein each the holding means, in each of the plurality of interfaces, includes a random access memory.

62. The system of claim 61 wherein each interface further includes a receiver that receives, at a time when the respective first signal is in the holding means, a multi-digit signal from the card in the plurality of cards.

63. The system of claim 52 wherein the interface junction is for touching the card.

64. The system of claim 52 wherein each of the plurality of cards further includes a card electrical contact and the interface junction of each of the plurality of interfaces includes an interface electrical contact for sending a current from the interface electrical contact to the card electrical contact.

* * * * *